US012627223B2

(12) United States Patent
Zhang et al.

(10) Patent No.: US 12,627,223 B2
(45) Date of Patent: May 12, 2026

(54) CONTROL METHOD FOR RESONANT CONVERSION CIRCUIT

(71) Applicant: Delta Electronics (Shanghai) Co., Ltd., Shanghai (CN)

(72) Inventors: Wen Zhang, Shanghai (CN); Hong Liu, Shanghai (CN); Baihui Song, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 243 days.

(21) Appl. No.: 18/613,745

(22) Filed: Mar. 22, 2024

(65) Prior Publication Data

US 2024/0333142 A1　　Oct. 3, 2024

(30) Foreign Application Priority Data

Mar. 29, 2023　　(CN) .......................... 202310325778.9

(51) Int. Cl.
H02M 1/088 (2006.01)
H02M 1/00 (2006.01)
(Continued)

(52) U.S. Cl.
CPC ......... H02M 3/015 (2021.05); H02M 1/0058 (2021.05); H02M 1/088 (2013.01);
(Continued)

(58) Field of Classification Search
CPC .......... H02M 3/015; H02M 1/08; H02M 1/36; H02M 3/28; H02M 3/325; H02M 3/24;
(Continued)

(56) References Cited

U.S. PATENT DOCUMENTS

| | | | | |
|---|---|---|---|---|
| 12,483,122 | B2 * | 11/2025 | Liu ................... | H02M 3/33576 |
| 2014/0313790 | A1 * | 10/2014 | Feng ....................... | H02M 1/36 |
| | | | | 363/21.02 |
| 2025/0202372 | A1 * | 6/2025 | Panov ..................... | H02M 1/08 |

FOREIGN PATENT DOCUMENTS

| | | |
|---|---|---|
| CN | 110233574 A | 9/2019 |
| CN | 111293889 B | 5/2021 |

(Continued)

*Primary Examiner* — Thienvu V Tran
*Assistant Examiner* — Jonathan Walter Soileau
(74) *Attorney, Agent, or Firm* — KIRTON McCONKIE; Evan R. Witt

(57) ABSTRACT

A control circuit for a resonant conversion circuit is provided. The resonant conversion circuit includes a switching circuit, a resonant network and a rectifier circuit. Firstly, a starting point of an operating trajectory with a plurality of trajectory segments is determined according to a sampling data sampled at a first switching time point. Then, the starting point of each trajectory segment is determined. The operating mode is determined according to the starting point of the corresponding trajectory segment, and a curve and an end point of the trajectory segment are predicted according to the operating mode. Then, the duration time of each trajectory segment is calculated. The end point of the operating trajectory is determined according to a control instruction. According to the execution time between the starting point and the end point of the operating trajectory, a next switching time point is controlled.

26 Claims, 18 Drawing Sheets

(51) Int. Cl.

| | |
|---|---|
| *H02M 1/12* | (2006.01) |
| *H02M 3/00* | (2006.01) |
| *H02M 3/335* | (2006.01) |
| *H02M 3/337* | (2006.01) |

(52) U.S. Cl.

CPC .............. *H02M 1/12* (2013.01); *H02M 3/01* (2021.05); *H02M 3/33573* (2021.05); *H02M 3/3376* (2013.01); *Y02B 70/10* (2013.01)

(58) Field of Classification Search

CPC ............ H02M 3/335; H02M 3/33569; H02M 3/33507; H02M 2007/4815; H02M 2007/4818; H02M 1/083; H02M 3/33538; H02M 3/33546; H02M 3/33515; H02M 3/33576; H02M 3/33592; H02M 3/33553; H02M 3/33523; H02M 3/33561; H02M 3/33573; H02M 3/01; H02M 3/3376; H02M 1/0058; H02M 1/088; H02M 1/12; H02M 3/3353; H02M 3/155; H02M 3/1582; H02M 1/4233; H02M 3/07; H02M 7/219; H02M 7/4815; H02M 1/0048; H02M 7/4818; H02M 7/4826; H02M 7/4833; H03M 3/22; Y02B 70/10

See application file for complete search history.

(56) References Cited

FOREIGN PATENT DOCUMENTS

| CN | 110445390 B | 8/2021 |
|---|---|---|
| CN | 112600432 B | 12/2021 |
| CN | 113391546 B | 5/2022 |
| CN | 113346728 B | 6/2022 |

* cited by examiner

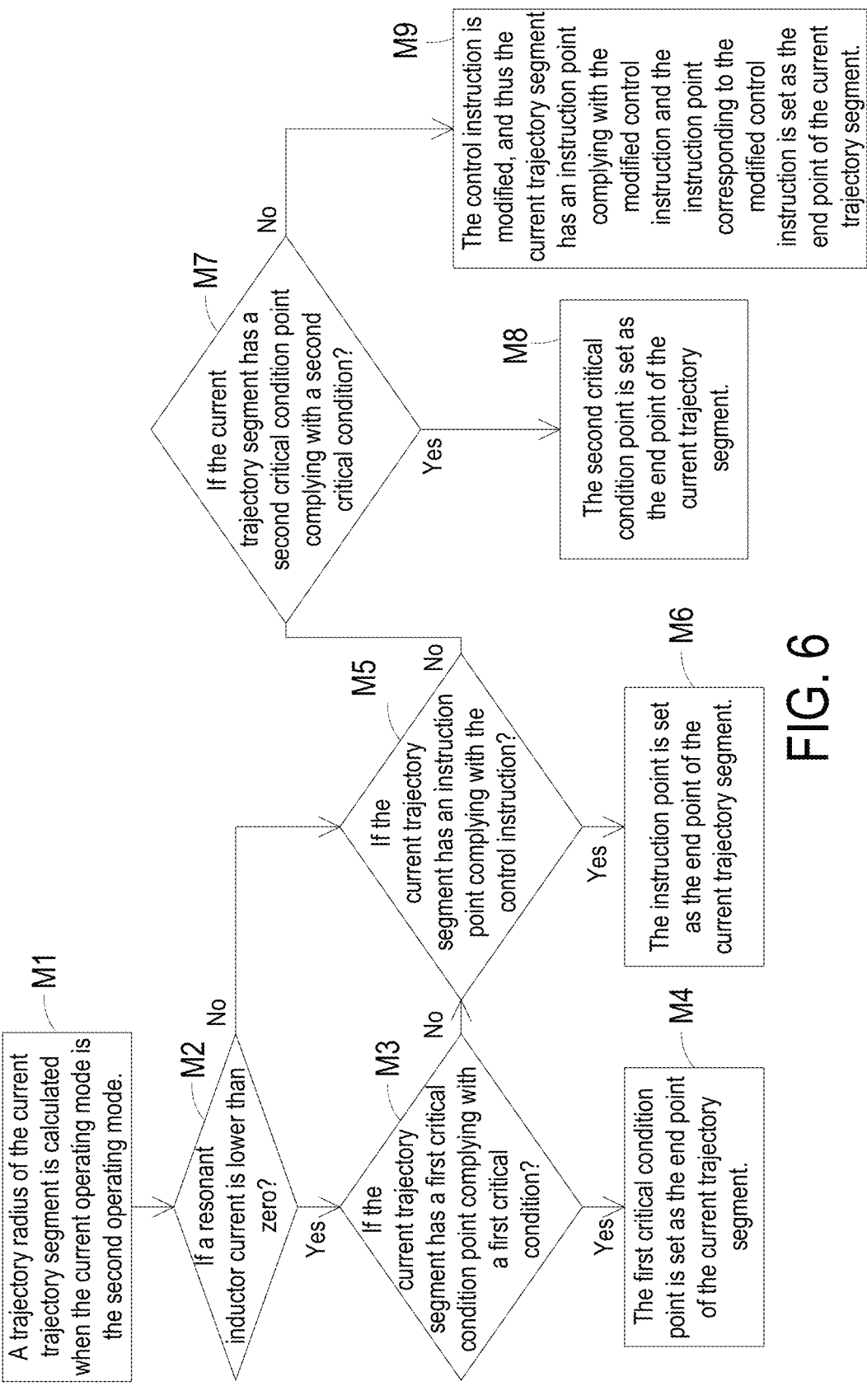

M1

A trajectory radius of the current trajectory segment is calculated when the current operating mode is the second operating mode.

M2

If a resonant inductor current is lower than zero?

No

Yes

M3

If the current trajectory segment has a first critical condition point complying with a first critical condition?

No

Yes

M4

The first critical condition point is set as the end point of the current trajectory segment.

M5

If the current trajectory segment has an instruction point complying with the control instruction?

No

Yes

M6

The instruction point is set as the end point of the current trajectory segment.

M7

If the current trajectory segment has a second critical condition point complying with a second critical condition?

No

Yes

M8

The second critical condition point is set as the end point of the current trajectory segment.

M9

The control instruction is modified, and thus the current trajectory segment has an instruction point complying with the modified control instruction and the instruction point corresponding to the modified control instruction is set as the end point of the current trajectory segment.

FIG. 6

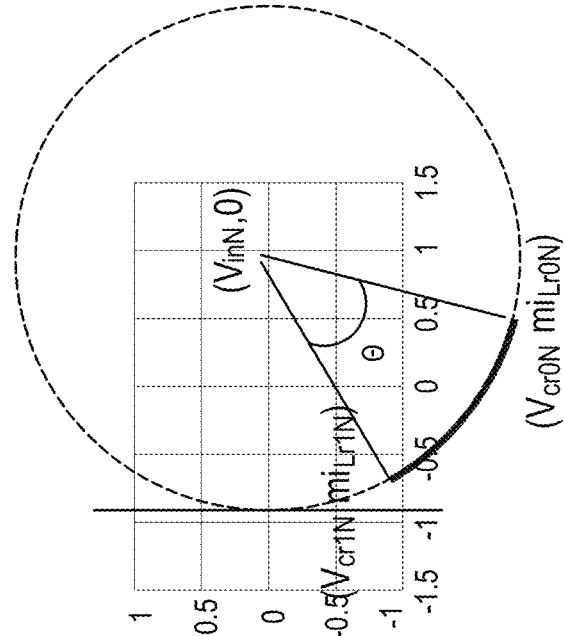
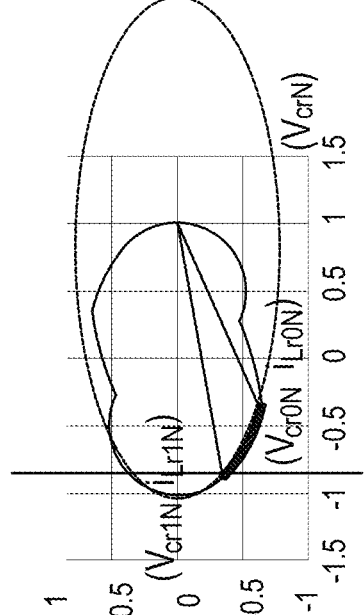
FIG. 10C

No high-frequency fluctuation in the resonant cavity

CONTROL METHOD FOR RESONANT CONVERSION CIRCUIT

CROSS-REFERENCE TO RELATED APPLICATION

This application claims priority to China Patent Application No. 202310325778.9, filed on Mar. 29, 2023, the entire contents of which are incorporated herein by reference for all purposes.

FIELD

The present disclosure relates to a control method for a resonant conversion circuit, and more particularly to a control method for a resonant conversion circuit to achieve good dynamic response.

BACKGROUND

An isolated DC/DC converter includes an LLC resonant conversion circuit. The LLC resonant conversion circuit has the advantages of high efficiency and small size. Consequently, the LLC resonant conversion circuit is widely used in various power supplies. With the diversification of applications, it is necessary to widen the operation range of the output voltage of the LLC resonant conversion circuit. For example, in case that the load is a battery, the changes of the voltage and the power of the battery in the charging/discharging process are large. Consequently, the output voltage with a wide range is required. In case that the load is a data center and the power source includes a single-phase two-stage power supply structure, the output voltage with a wide range is also required. Generally, in the single-phase two-stage power supply structure, the front stage is a PFC circuit, and the rear stage is an LLC resonant conversion circuit. Since the power frequency fluctuation of the input voltage of the LLC resonant conversion circuit is doubled, the output voltage of the LLC resonant conversion circuit with a wide range is required.

In the conventional LLC resonant conversion circuit, a closed-loop feedback mechanism of the output voltage is used to directly control the frequency to obtain a wider range of the output voltage. However, since the relationship between the output voltage and the frequency is not linear, the transfer function is varied under different operating conditions. In order to enhance the stability of all operating states, it is necessary to design the proportional and integral parameters of the LLC resonant conversion circuit, which severely limits the dynamic performance of the LLC resonant conversion circuit.

In order to overcome the drawbacks of the conventional technologies, it is important to provide an improved control method for a resonant conversion circuit.

SUMMARY

In accordance with an aspect of present disclosure, a control method for a resonant conversion circuit is provided. The resonant conversion circuit includes a switching circuit, a resonant network and a rectifier circuit. The resonant network is connected with the switching circuit. The rectifier circuit is coupled with the resonant network. The resonant network includes a resonant capacitor and a resonant inductor. The control method includes the following steps. In a step (S0), a starting point of an operating trajectory is determined according to a sampling data at a first switching time point, wherein the operating trajectory includes N trajectory segments, and N is a positive integer. Then, a step (S1) is performed to determine an initial operating mode of the resonant conversion circuit according to a starting point of a first trajectory segment of the N trajectory segments. The starting point of the first trajectory segment is a starting point of the operating trajectory. In a step (S2), the first trajectory segment is set as a current trajectory segment, and the initial operating mode is set as a current operating mode. In a step (S3), a curve of the current trajectory segment and an end point of the current trajectory segment are predicted according to the current operating mode. In a step (S4), a time duration of the current trajectory segment is calculated. Then, a step (S5) is performed to determine whether the end point of the current trajectory segment is an instruction point complying with a control instruction. If a determining condition of the step (S5) is not satisfied, a step (S6) is performed. If the determining condition of the step (S5) is satisfied, a step (S10) is performed. In the step (S6), the end point of the current trajectory segment is set as a starting point of a next trajectory segment. Then, in a step (S7), a next operating mode of the resonant conversion circuit is determined according to the starting point of the next trajectory segment. In a step (S8), the next trajectory segment is set as the current trajectory segment, and the next operating mode is set as the current operating mode. In a step (S9), the step (S3) is performed again. In the step (S10), the instruction point is set as an end point of the operating trajectory, and an execution time from the starting point of the operating trajectory to the end point of the operating trajectory is calculated. In a step (S11), a second switching time point is determined according to the execution time.

The above contents of the present disclosure will become more readily apparent to those ordinarily skilled in the art after reviewing the following detailed description and accompanying drawings, in which:

BRIEF DESCRIPTION OF THE DRAWINGS

FIG. 6 is a flowchart of a control method for the resonant conversion circuit as shown in FIG. 1, in which the current operating mode of the resonant conversion circuit is the O mode;

FIG. 10C is a plot illustrating the trajectory segment of the resonant conversion circuit when the operating mode is the O mode;

DETAILED DESCRIPTION OF THE
PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

The present disclosure provides a control circuit for a resonant conversion circuit. The resonant conversion circuit includes a power source, a switching circuit, a resonant network, a transformer, a rectifier circuit and a controller. Firstly, an input voltage of the switching circuit, an output voltage of the rectifier circuit, a resonant inductance, a resonant capacitance, a resonant inductor current and a resonant capacitor voltage are sampled at a first switching time point, and a sampling data is obtained. A starting point of an operating trajectory is determined according to the sampling data. The operating trajectory includes a single trajectory segment or a plurality of trajectory segments. The starting point of the first trajectory segment is the starting point of the operating trajectory. The starting point of each trajectory segment is the end point of the previous trajectory segment. The end point of the last trajectory segment is the end point of the operating trajectory. Each trajectory segment is determined according to a corresponding operating mode. The operating mode is determined according to the starting point of the corresponding trajectory segment. In different operating modes, the curves of the trajectory segments are different. The operating mode of the resonant conversion circuit 1 includes a first operating mode, a second operating mode and a third operating mode. The first operating mode is an N mode. The second operating mode is an O mode. The third operating mode is a P mode. The end point of the operating trajectory is determined according to a control instruction. According to the execution time between the starting point and the end point of the operating trajectory, the next switching time point is controlled.

In the following embodiments, the resonant conversion circuit is an LLC resonant conversion circuit. Moreover, the method of determining the operating trajectory and the execution time will be described as follows.

Figure 1:
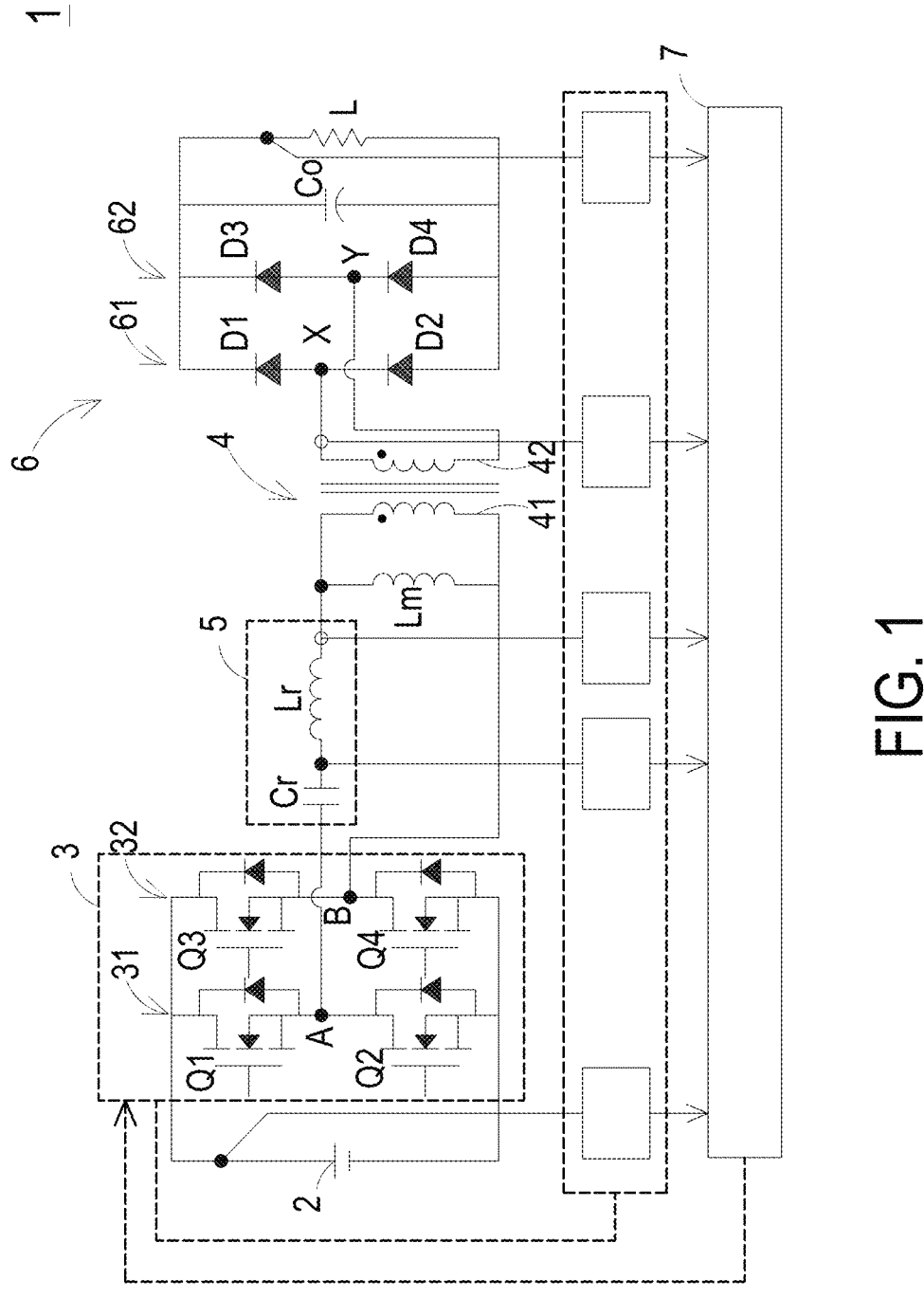
FIG. 1 is a schematic circuit diagram illustrating the circuitry structure of a resonant conversion circuit according to an embodiment of the present disclosure.
Figure 2:
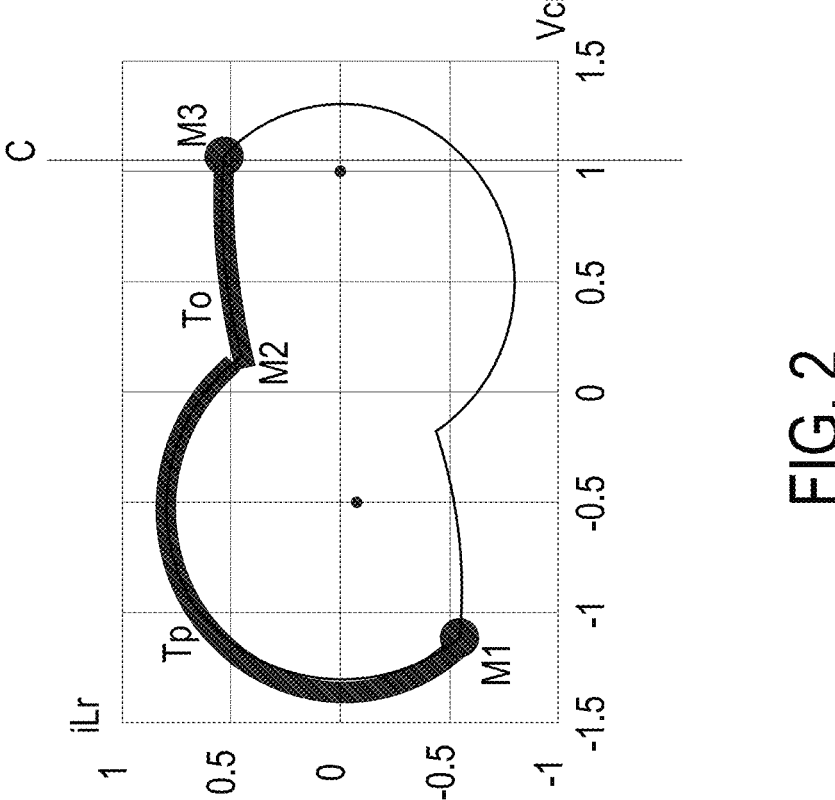
FIG. 2 is a plot illustrating the operating modes and the operating trajectory of the resonant conversion circuit as shown in FIG. 1.

Please refer to FIGS. 1 and 2. FIG. 1 is a schematic circuit diagram illustrating the circuitry structure of a resonant conversion circuit according to an embodiment of the present disclosure. In this embodiment, the resonant conversion circuit is an LLC resonant conversion circuit. FIG. 2 is a plot illustrating the operating modes and the operating trajectory of the LLC resonant conversion circuit as shown in FIG. 1.

In this embodiment, the LLC resonant conversion circuit 1 includes a power source 2, a switching circuit 3, a resonant network 5, a transformer 4, a rectifier circuit 6 and a controller 7, which are connected successively. By the LLC resonant conversion circuit 1, an input power from the power source 2 is converted into an output power. In addition, the output power is provided to a load L.

The switching circuit 3 includes a first bridge arm 31 and a second bridge arm 32. The two terminals of the first bridge arm 31 are respectively connected with two terminals of the power source 2. The first bridge arm 31 includes a first switch Q1 and a second switch Q2 which are connected in series. The connection point between the first switch Q1 and the second switch Q2 is a first node A. The two terminals of the second bridge arm 32 are respectively connected with two terminals of the power source 2. The second bridge arm 32 is connected with the first bridge arm 31 in parallel. The second bridge arm 32 includes a third switch Q3 and a fourth switch Q4 which are connected in series. The connection point between the third switch Q3 and the fourth switch Q4 is a second node B.

The transformer 4 includes a primary winding 41 and a secondary winding 42.

The resonant network 5 includes a resonant capacitor Cr and a resonant inductor Lr. In this embodiment, the resonant capacitor Cr and the resonant inductor Lr are connected between the first node A and the first terminal of the primary winding 41 of the transformer 4 in series. The second terminal of the primary winding 41 of the transformer 4 is electrically connected with the second node B.

The rectifier circuit 6 includes a third bridge arm 61, a fourth bridge arm 62 and an output capacitor Co. The third bridge arm 61, the fourth bridge arm 62 and the output capacitor Co are connected with each other in parallel. The third bridge arm 61 includes a first diode D1 and a second diode D2 which are connected in series. The connection point between the first diode D1 and the second diode D2 is a third node X. The third node X is electrically connected with the first terminal of the secondary winding 42 of the transformer 4. The fourth bridge arm 62 includes a third diode D3 and a fourth diode D4 which are connected in series. The connection point between the third diode D3 and the fourth diode D4 is a fourth node Y. The fourth node Y is electrically connected with the second terminal of the secondary winding 42 of the transformer 4.

The controller 7 is electrically connected with the power source 2, the resonant capacitor Cr of the resonant network 5 and the resonant inductor Lr of the resonant network 5, the secondary winding 42 of the transformer 4 and the load L. In the LLC resonant conversion circuit 1 of this embodiment, an input voltage of the switching circuit 3, an output voltage of the rectifier circuit 6, a resonant parameter of the resonant network 5, a state information of the resonant network 5 corresponding to a first switching time point of the switching circuit 3 and a secondary side current flowing through the secondary winding 42 of the transformer 4 are sampled by the controller 7, consequently, a sampling data is obtained.

The resonant parameter of the resonant network 5 includes the inductance of the resonant inductor Lr and the capacitance of the resonant capacitor Cr. The state information of the resonant network 5 includes a resonant inductor current flowing through the resonant inductor Lr and a resonant capacitor voltage of the resonant capacitor Cr. The secondary side current is the current flowing through the secondary winding 42 of the transformer 4.

In FIGS. 1 and 2, the resonant inductor Lr is a single inductor or an equivalent inductor, and the resonant capacitor Cr is a single capacitor or an equivalent capacitor. In case that the resonant inductor Lr is the equivalent inductor, the resonant inductor Lr includes a plurality of inductors in series connection or in parallel connection, and optionally includes the equivalent leakage inductor of the transformer 4. In case that the resonant capacitor Cr is the equivalent capacitor, the resonant capacitor Cr includes a plurality of capacitors in series connection or in parallel connection, and optionally includes the equivalent parasitic capacitor of the transformer.

It is noted that numerous modifications may be made while retaining the teachings of the present disclosure. For example, in another embodiment, the secondary side current flowing through the secondary winding 42 of the transformer 4 is not sampled by the controller 7. That is, controller 7 does not need to sample the secondary current on the secondary winding 42 of transformer 4.

In an embodiment, the operating trajectory of the resonant conversion circuit 1 includes a single trajectory segment or a plurality of trajectory segments. A method of determining the operating trajectory will be described as follows.

At the first switching time point, a starting point of the operating trajectory is determined according to the sampling data. The starting point of the operating trajectory is also a starting point of a first trajectory segment.

Then, a first operating mode of the resonant conversion circuit 1 is determined according to the starting point of the first trajectory segment, and a curve and an end point of the first trajectory segment corresponding to the first operating mode are predicted. Then, the controller determines whether the end point of the first trajectory segment complies with an instruction point of a control instruction C.

If the end point of the first trajectory segment is an instruction point complying with the control instruction C, the operating trajectory is ended. Under this circumstance, the end point of the first trajectory segment is regarded as an end point of the operating trajectory.

If the end point of the first trajectory segment does not comply with the control instruction C, the end point of the first trajectory segment is used as a starting point of a second trajectory segment. In addition, a second operating mode corresponding to the second trajectory segment is continuously determined, and a curve and an end point of the second trajectory segment corresponding to the second operating mode are predicted. Then, the controller determines whether the end point of the second trajectory segment complies with the control instruction C.

If the end point of the second trajectory segment is the instruction point complying with the control instruction C, the operating trajectory is ended. Under this circumstance, the operating trajectory includes the first trajectory segment and the second trajectory segment, and the execution time of the operating trajectory is the sum of the time duration of the first trajectory segment and the time duration of the second trajectory segment.

If the end point of the second trajectory segment does not comply with the control instruction C, a curve and an end point of a next trajectory segment corresponding to a next operating mode are predicted.

The above procedures are repeatedly done until the end point of a specified trajectory segment complying with the control instruction C is obtained. Meanwhile, the operating trajectory is ended. Under this circumstance, the operating trajectory includes a plurality of trajectory segments, and the execution time of the operating trajectory is the sum of the time durations of the plurality of trajectory segments.

The definitions of the operating modes, the operating trajectory, the end points and the starting points will be illustrated with reference to FIGS. 1 and 2.

In FIG. 2, the X axis denotes the per-unit value of the resonant capacitor voltage of the resonant capacitor Cr, and the Y axis denotes the resonant inductor current flowing through the resonant inductor Lr. The line segment in FIG. 2 represents the operating trajectory of the resonant conversion circuit 1. The black thick line represents the operating trajectory of the resonant conversion circuit 1 at the first switching time point. The thin line represents the operating trajectory of the resonant conversion circuit 1 at the second switching time point.

Obviously, at the first switching time point, the operating trajectory M1M3 of the resonant conversion circuit 1 includes a first trajectory segment M1M2 and a second trajectory segment M2M3. When the resonant conversion circuit 1 is operated in the first operating mode, the corresponding trajectory segment is the first trajectory segment M1M2. According to the length of the first trajectory segment M1M2, the execution time Tp of the first trajectory segment M1M2 is calculated. According to the length of the second trajectory segment M2M3, the execution time To of the second trajectory segment M2M3 is calculated. Moreover, the first trajectory segment M1M2 has a first starting point M1 and a first end point M2. The first starting point M1 is also the starting point of the operating trajectory M1M3. The first starting point M1 is determined according to the sampling data at the first switching time point.

After the curve of the first trajectory segment M1M2 is predicted according to the first operating mode, the controller 7 receives a control instruction C to determine whether the first trajectory segment M1M2 has any instruction point complying with the control instruction C. As shown in FIG. 2, the control instruction C may be set according to the practical requirements. If there is an intersection between the operating trajectory and the control instruction C, it means that the determining condition is satisfied. Whereas, if there is no intersection between the operating trajectory and the control instruction C, it means that the determining condition is not satisfied.

Please refer to FIG. 2 again. Since the controller 7 determines that the first trajectory segment M1M2 has no instruction point complying with the control instruction C, a critical condition point M2 of the first trajectory segment M1M2 is used as the end point of the first trajectory segment M1M2. Then, the time duration of the first trajectory segment M1M2 is obtained. Moreover, since there is no intersection between the operating trajectory and the control instruction C, the operating trajectory is not ended. Then, the end point M2 of the first trajectory segment M1M2 is used as the starting point of the second trajectory segment.

Then, according to the starting point M2 of the second trajectory segment M2, the second operating mode is determined. Then, a curve and an end point of the second trajectory segment M2M3 corresponding to the second operating mode are predicted. As shown in FIG. 2, the second trajectory segment M2M3 includes the instruction point M3 complying with the control instruction C. Consequently, the instruction point M3 is the end point of the second trajectory segment M2M3. Also, the instruction point M3 is the end point of the operating trajectory.

As mentioned above, the starting point of the operating trajectory is determined according to the sampling data, and the end point of the operating trajectory is determined according to the control instruction C. For each trajectory segment, the starting point of the trajectory segment is either the starting point of the operating trajectory or the end point of the previous trajectory segment. Moreover, the end point of each trajectory segment complies with one of the following two possible conditions. In the first condition, the end point of the trajectory segment is the instruction point complying with the control instruction C, and the operating trajectory is ended at the instruction point. In the second condition, the end point of the trajectory segment is a critical condition point complying with a critical condition, the trajectory segment is ended at the critical condition point, but the operating trajectory is not ended at the critical condition point. That is, the critical condition point is used as the starting point of the next trajectory segment. Then, the procedure of determining the operating mode and the procedure of predicting the end point of the next trajectory segment are repeatedly done.

As mentioned above, the operating trajectory is started from the starting point that is determined according to the sampling data, and the instruction point on one track segment or multiple track segments complying with the control instruction C is used as the end point of the operating trajectory. According to the execution time between the starting point and the end point of the operating trajectory, the next switching time point is controlled. That is, according to the execution time, all switches of the switching circuit 3 (i.e., the first switch Q1, the second switch Q2, the third switch Q3 and the fourth switch Q4) are controlled to be operated at a control frequency corresponding to the execution time.

Figure 3:
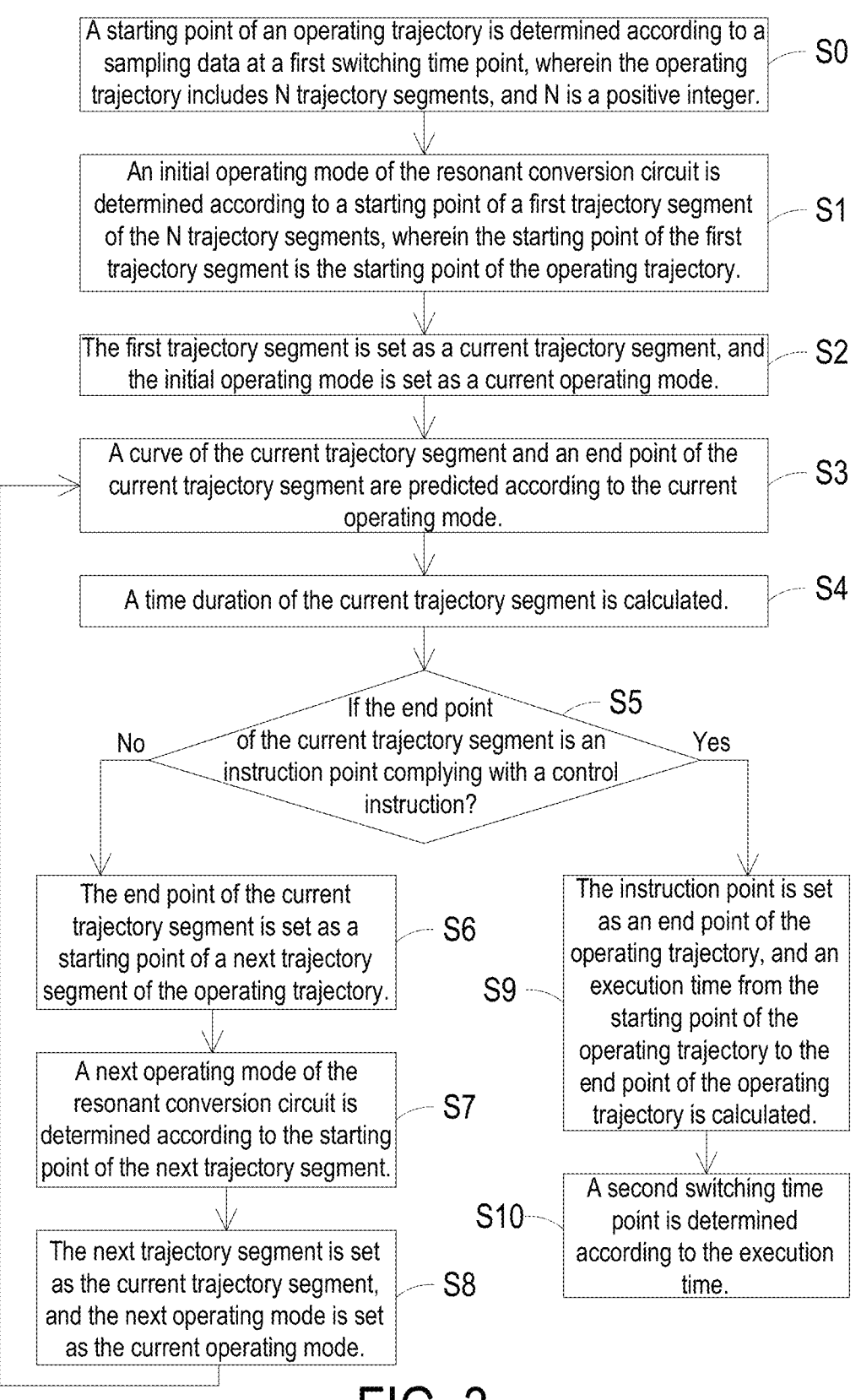
FIG. 3 is a flowchart of a control method for the resonant conversion circuit as shown in FIG. 1.

FIG. 3 is a flowchart of a control method for the resonant conversion circuit as shown in FIG. 1. The control method includes the following steps.

Firstly, in a step S0, a starting point of an operating trajectory is determined according to a sampling data at a first switching time point. The operating trajectory includes N trajectory segments, wherein N is a positive integer.

Then, in a step S1, an initial operating mode of the resonant conversion circuit is determined according to a starting point of a first trajectory segment of the N trajectory segments. The starting point of the first trajectory segment is the starting point of the operating trajectory.

Then, in a step S2, the first trajectory segment is set as a current trajectory segment, and the initial operating mode is set as a current operating mode.

Then, in a step S3, a curve of the current trajectory segment and an end point of the current trajectory segment are predicted according to the current operating mode.

Then, in a step S4, a time duration of the current trajectory segment is calculated.

Then, a step S5 is performed to determine whether the end point of the current trajectory segment is an instruction point complying with a control instruction C.

If a determining condition of the step S5 is not satisfied, it means that the end point of the current trajectory segment is not the instruction point complying with the control instruction C. Then, step S6 is Performed, the end point of the current trajectory segment is set as a starting point of a next trajectory segment of the operating trajectory. Then, in a step S7, a next operating mode of the resonant conversion circuit is determined according to the starting point of the next trajectory segment. Then, in a step S8, the next trajectory segment is set as the current trajectory segment, and the next operating mode is set as the current operating mode. After the step S8, the step S3 is repeatedly done.

If the determining condition of the step S5 is satisfied, it means that the end point of the current trajectory segment is the instruction point complying with the control instruction C. Then, step S9 is Performed, the instruction point is set as an end point of the operating trajectory, and an execution time from the starting point of the operating trajectory to the end point of the operating trajectory is calculated. Then, in a step S10, a second switching time point is determined according to the execution time.

In this embodiment, the operating mode of the resonant conversion circuit 1 (e.g., the initial operating mode, the current operating mode or the next operating mode) includes a first operating mode, a second operating mode and a third operating mode. The first operating mode is an N mode. The second operating mode is an O mode. The third operating mode is a P mode. The type of the initial operating mode is determined according to the sampling data. As mentioned above, the sampling data includes the input voltage of the switching circuit 3, the output voltage of the rectifier circuit 6, the resonant parameter of the resonant network 5, the state information of the resonant network 5 corresponding to the first switching time point of the switching circuit 3 and/or the secondary side current flowing through the secondary winding 42 of the transformer 4. In the following example, the sampling data includes the secondary side current flowing through the secondary winding 42 of the transformer 4. That is, the type of the initial operating mode is determined according to the secondary side current flowing through the secondary winding 42 of the transformer 4.

Figure 4A:
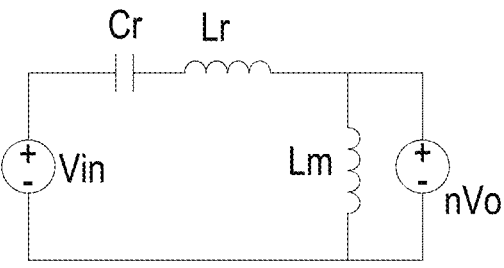
FIG. 4A is a schematic circuit diagram illustrating the circuitry structure of the resonant conversion circuit shown in FIG. 1, in which the initial operating mode is the P mode.
Figure 4B:
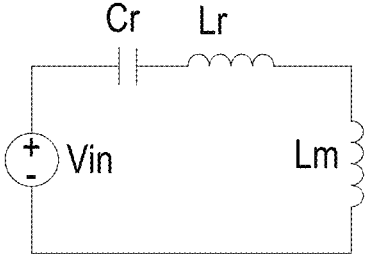
FIG. 4B is a schematic circuit diagram illustrating the circuitry structure of the resonant conversion circuit shown in FIG. 1, in which the initial operating mode is the O mode.
Figure 4C:
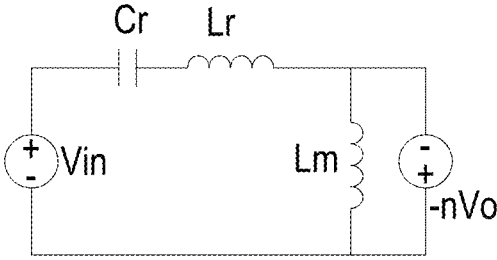
FIG. 4C is a schematic circuit diagram illustrating the circuitry structure of the resonant conversion circuit shown in FIG. 1, in which the initial operating mode is the N mode.

FIG. 4A is a schematic circuit diagram illustrating the circuitry structure of the resonant conversion circuit shown in FIG. 1, in which the initial operating mode is the P mode. FIG. 4B is a schematic circuit diagram illustrating the circuitry structure of the resonant conversion circuit shown in FIG. 1, in which the initial operating mode is the O mode. FIG. 4C is a schematic circuit diagram illustrating the circuitry structure of the resonant conversion circuit shown in FIG. 1, in which the initial operating mode is the N mode.

As shown in FIG. 4A, the secondary side current flowing through the secondary winding 42 of the transformer 4 is greater than zero. Under this circumstance, the initial operating mode of the resonant conversion circuit is the P mode.

As shown in FIG. 4B, the secondary current flowing through the secondary winding 42 of the transformer 4 is zero. Under this circumstance, the initial operating mode of the resonant conversion 1 is the O mode.

As shown in FIG. 4C, the secondary current flowing through the secondary winding 42 of the transformer 4 is lower than zero. Under this circumstance, the initial operating mode of the resonant conversion 1 is the N mode.

The trajectory segment and the trajectory radius of the resonant conversion circuit 1 are determined according to the operating mode. Especially, the resonant conversion circuit 1 can be operated in a single operating mode or a combinational mode of a plurality of operating modes. In addition, the operating mode of the resonant conversion circuit 1 may be switched according to the operating conditions.

Figure 5A:
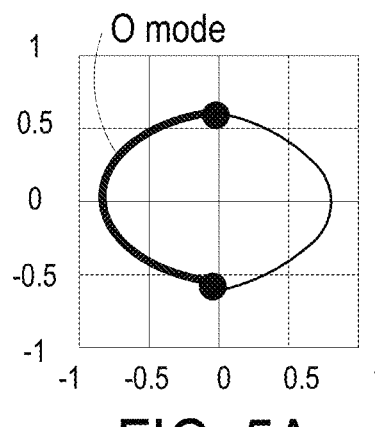
FIGS. 5A, 5B and 5C are plots illustrating the operating trajectories of the resonant conversion circuit in different operating modes.
Figure 5B:
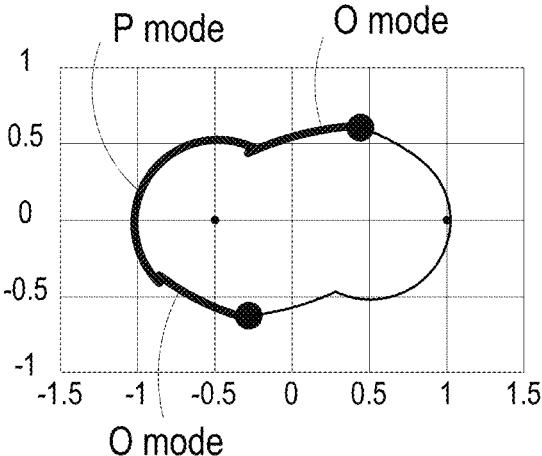
Figure 5C:
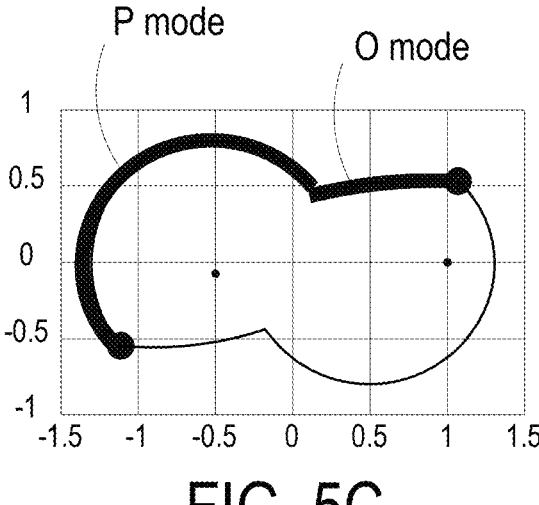

FIGS. 5A, 5B and 5C are plots illustrating the operating trajectories of the resonant conversion circuit in different operating modes. In the drawings, the black thick line represents the operating trajectory of the resonant conversion circuit 1 at the first switching time point, and the thin line represents the operating trajectory of the resonant conversion circuit 1 at the second switching time point.

As shown in FIG. 5A, the resonant conversion circuit 1 is operated in a single operating mode (e.g., the O mode) after the first switching time point. In other words, the operating trajectory has a single trajectory segment and a single trajectory radius.

As shown in FIG. 5B, the resonant conversion circuit 1 is operated in a combinational mode of three operating modes after the first switching time point. That is, the resonant conversion circuit 1 is operated in the O mode, the P mode and the O mode sequentially. The conditions about the mode switching action will be described later. In other words, the operating trajectory includes three trajectory segments, e.g., a first trajectory segment, a second trajectory segment and a third trajectory segment.

As shown in FIG. 5C, the resonant conversion circuit 1 is operated in a combinational mode of two operating modes after the first switching time point. That is, the resonant conversion circuit 1 is operated in the P mode and the O mode sequentially. The conditions about the mode switching action will be described later.

It is noted that the number of the operating modes and the sequence of the operating modes after the first switching time point are not restricted.

As mentioned above, in the operating trajectory including a single trajectory segment or a plurality of trajectory segments, the operating mode of any trajectory segment can be determined after the start point of the corresponding trajectory segment is determined. The shape of the trajectory segment(s) corresponding to each operating mode is confirmed. Consequently, it is only necessary to determine the end point of the trajectory segment.

A method for determining the end point of the current trajectory segment in the operating trajectory will be described as follows. Please refer to FIGS. 1, 3 and 6. FIG. 6 is a flowchart of a control method for the resonant conversion circuit as shown in FIG. 1, in which the current operating mode of the resonant conversion circuit is the O mode.

If the controller 7 determines that the current operating mode of the resonant conversion circuit 1 is the O mode (i.e., the second mode), the step S3 includes the following steps.

Firstly, in a step M1, a trajectory radius of the current trajectory segment is calculated when the current operating mode is the second operating mode.

Then, a step M2 is performed to determine whether a resonant inductor current is lower than zero.

If the determining condition of the step M2 is satisfied, it means that the resonant inductor current is less than 0. Then, a step M3 is performed to determine Whether there is a first critical condition point satisfying the first critical condition on the current trajectory segment.

If the step M3 is satisfied, it means that the first critical condition point exists in the current trajectory segment, a step M4 is performed, and the first critical condition point is set as the end point of the current trajectory segment.

If the determining condition of the step M2 is not satisfied, it means that the resonant inductor current is greater than or equal to 0, or the step M3 is not satisfied, it means that there is not a first critical condition point satisfying the first critical condition on the current trajectory segment, then, the step M5 is performed to determine whether the current trajectory segment has an instruction point complying with the control instruction C.

If the determining condition of the step M5 is satisfied, it means that the current trajectory segment has an instruction point complying with the control instruction C. Then, in a step M6 is performed, the instruction point is set as the end point of the current trajectory segment.

If the determining condition of the step M5 is not satisfied, a step M7 is performed to determine whether the current trajectory segment has a second critical condition point complying with a second critical condition.

If the determining condition of the step M7 is satisfied, it means that current trajectory segment has the second critical condition point. Then, in a step M8, the second critical condition point is set as the end point of the current trajectory segment.

If the determining condition of the step M7 is not satisfied, it means that the current trajectory segment does not have second critical condition point. Then, in a step M9, the control instruction C is modified. Consequently, the current trajectory segment has an instruction point complying with the modified control instruction C, and the instruction point corresponding to the modified control instruction C is set as the end point of the current trajectory segment.

In case that the current operating mode of the resonant conversion circuit 1 is the O mode (i.e., the second mode), the trajectory radius may be calculated according to the following mathematic formulae:

$$R_{ON} = \sqrt{(V_{crON} - V_{inN})^2 + (mi_{LrON})^2}$$

$$m = \sqrt{\frac{L_m + L_r}{L_r}}$$

In the above mathematic formulae, $R_{ON}$ is the per-unit value of the trajectory radius of the current trajectory segment when the current operating mode is the second mode, $V_{crON}$ is the per-unit value of the resonant capacitor voltage at the starting point of the current trajectory segment, $V_{inN}$ is the per-unit value of the input voltage of the switching circuit 3, $i_{LrON}$ is the per-unit value of the resonant inductor current at the starting point of the current trajectory segment, $L_m$ is the inductance value of the magnetizing inductor of the transformer 4, and $L_r$ is the inductance value of the resonant inductor.

If the determining condition of the step M3 is satisfied, it means that the current trajectory segment has a first critical condition point complying with the first critical condition. Meanwhile, the following mathematic formulae are deduced:

$$V_{crN} = V_{crLmtN\_P}$$

$$V_{crLmtN\_P} = -V_{inN} + V_{ON} * \frac{L_m + L_r}{L_m}$$

In the above mathematic formulae, $V_{crN}$ is the per-unit value of the resonant capacitor voltage of the resonant capacitor Cr, $V_{inN}$ is the per-unit value of the input voltage of the switching circuit 3, $V_{ON}$ is the per-unit value of the output voltage of the rectifier circuit 6, $L_m$ is the inductance value of the magnetizing inductor of the transformer 4, and $L_r$ is the inductance value of the resonant inductor.

If the determining condition of the step M5 is satisfied, it means that the current trajectory segment has an instruction point complying with the control instruction C. Meanwhile, the following mathematic formulae are deduced:

$$|R_{ON} + V_{inN}| > V_{crLmtN\_N}$$

$$V_{crLmtN\_N} = V_{inN} + V_{ON} * \frac{L_m + L_r}{L_m}$$

In the above mathematic formulae, $R_{ON}$ is the per-unit value of the trajectory radius of the current trajectory segment when the current operating mode is the second mode, $V_{inN}$ is the per-unit value of the input voltage of the switching circuit 3, $V_{ON}$ is the per-unit value of the output voltage of the rectifier circuit 6, $L_m$ is the inductance value of the magnetizing inductor of the transformer 4, and $L_r$ is the inductance value of the resonant inductor.

If the determining condition of the step M7 is satisfied, it means that the current trajectory segment has a second critical condition point complying with the second critical condition. Meanwhile, the following mathematic formulae are deduced:

$$V_{crN} = V_{crLmtN\_N}$$

$$V_{crLmtN\_N} = V_{inN} + V_{ON} * \frac{L_m + L_r}{L_m}$$

In the above mathematic formulae, $V_{crN}$ is the per-unit value of the resonant capacitor voltage on the resonant capacitor Cr, $V_{inN}$ is the per-unit value of the input voltage of the switching circuit 3, $V_{ON}$ is the per-unit value of the output voltage of the rectifier circuit 6, $L_m$ is the inductance value of the magnetizing inductor of the transformer 4, and $L_r$ is the inductance value of the resonant inductor.

In an embodiment, the control instruction C is modified by the controller 7 according to the following mathematic formula:

$$i_{LrN} = i_{LrRefN}$$

In the above mathematic formula, $i_{LrN}$ is the per-unit value of the resonant inductor current, and $i_{LrRefN}$ is the per-unit value of the lowest reference current for achieving the zero-current switching function.

In case that the resonant conversion circuit 1 complies with the above mathematic formulae, the resonance cavity of the resonant conversion circuit 1 has reached the nearest state point relative to the original control instruction, and the zero-current switching condition is satisfied. Consequently, the original control instruction will not exceed the range of the operating trajectory, and the resonant converter 1 can be operated normally.

In case that the current operating mode is the second mode and the end point of the current trajectory segment is the first critical condition point, the first critical condition point is the starting point of the next trajectory segment. In addition, the corresponding next operating mode is the third operating mode.

In case that the current operating mode is the second mode and the end point of the current trajectory segment is the second critical condition point, the second critical condition point is the starting point of the next trajectory segment. In addition, the corresponding next operating mode is the first operating mode.

Figure 7:
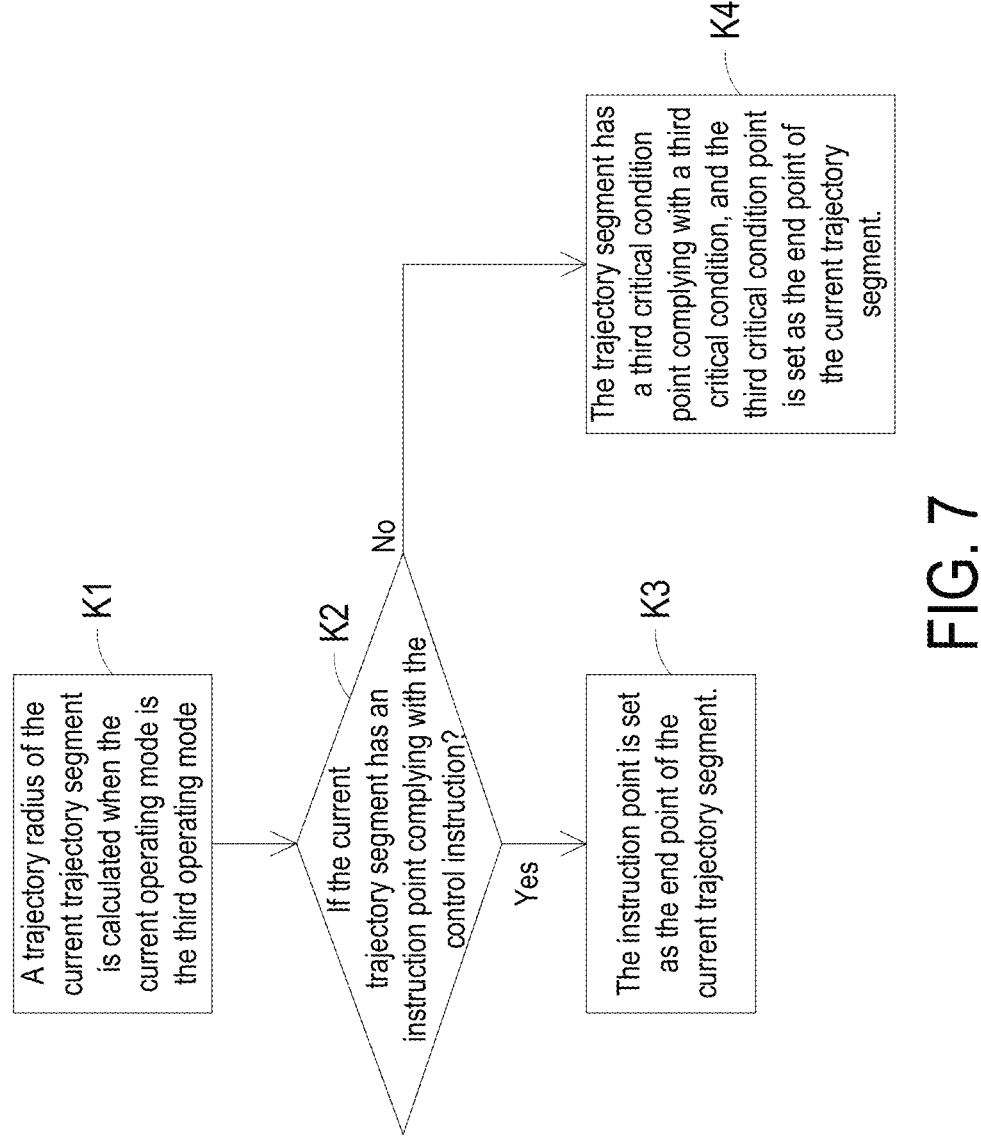
FIG. 7 is a flowchart of a control method for the resonant conversion circuit, in which the current operating mode of the resonant conversion circuit is the P mode.

Please refer to FIGS. 1, 3 and 7. FIG. 7 is a flowchart of a control method for the resonant conversion circuit, in which the current operating mode of the resonant conversion circuit is the P mode. If the controller 7 determines that the current operating mode of the resonant conversion circuit 1 is the P mode (i.e., the third mode), the step S3 further includes the following steps.

Firstly, in a step K1, a trajectory radius of the current trajectory segment is calculated when the current operating mode is the third operating mode.

Then, a step K2 is performed to determine whether the current trajectory segment has an instruction point complying with the control instruction C.

If the determining condition of the step K2 is satisfied, it means that the current trajectory segment has an instruction point complying with the control instruction C. Then, in a step K3, the instruction point is set as the end point of the current trajectory segment.

If the determining condition of the step K2 is not satisfied, it means that the current trajectory segment has no instruction point complying with the control instruction C. Then, in a step K4, it is determined that the trajectory segment has a third critical condition point complying with a third critical condition, and the third critical condition point is set as the end point of the current trajectory segment.

In case that the current operating mode is the third mode and the end point of the current trajectory segment is the third critical condition point, the third critical condition point is set as the starting point of the next trajectory segment. In addition, the corresponding next operating mode is the second operating mode.

In case that the current operating mode of the resonant conversion circuit 1 is the P mode (i.e., the third mode), the trajectory radius may be calculated according to the following mathematic formula:

$$R_{PN} = \sqrt{(V_{crON} - (V_{inN} - V_{ON}))^2 + (i_{LrON})^2}$$

In the above mathematic formulae, $R_{PN}$ is the per-unit value of the trajectory radius of the current trajectory segment when the current operating mode is the third mode, $V_{crON}$ is the per-unit value of the resonant capacitor voltage at the starting point of the current trajectory segment, $V_{inN}$ is the per-unit value of the input voltage of the switching circuit 3, $V_{ON}$ is the per-unit value of the output voltage of the rectifier circuit 6, and $i_{LrON}$ is the per-unit value of the resonant inductor current at the starting point of the current trajectory segment.

If the determining condition of the step K2 is satisfied, in means that the current trajectory segment has an instruction point complying with the control instruction C. Meanwhile, the following mathematic formula is deduced:

$$R_{PN} + (V_{inN} - V_{ON}) > V_{crRrefN}$$

In the above mathematic formula, $R_{PN}$ is the per-unit value of the trajectory radius of the current trajectory segment when the current operating mode is the third mode, $V_{inN}$ is the per-unit value of the input voltage of the switching circuit 3, $V_{ON}$ is the per-unit value of the output voltage of the rectifier circuit 6, and $V_{crRrefN}$ is the per-unit value of an instruction voltage.

In the step K4, in case that the current trajectory segment has the third critical condition point complying with the third critical condition, the following mathematic formulae are deduced:

$$i_{soN}=0 \text{ or } i_{LrN}=i_{LmN}$$

In the above mathematic formulae, $i_{soN}$ is the per-unit value of the secondary current flowing through the secondary winding 42, $i_{LrN}$ is the per-unit value of the resonant inductor current flowing through the resonant inductor $L_r$, and $i_{LmN}$ is the per-unit value of the magnetizing inductor current flowing through the transformer 4.

Figure 8:
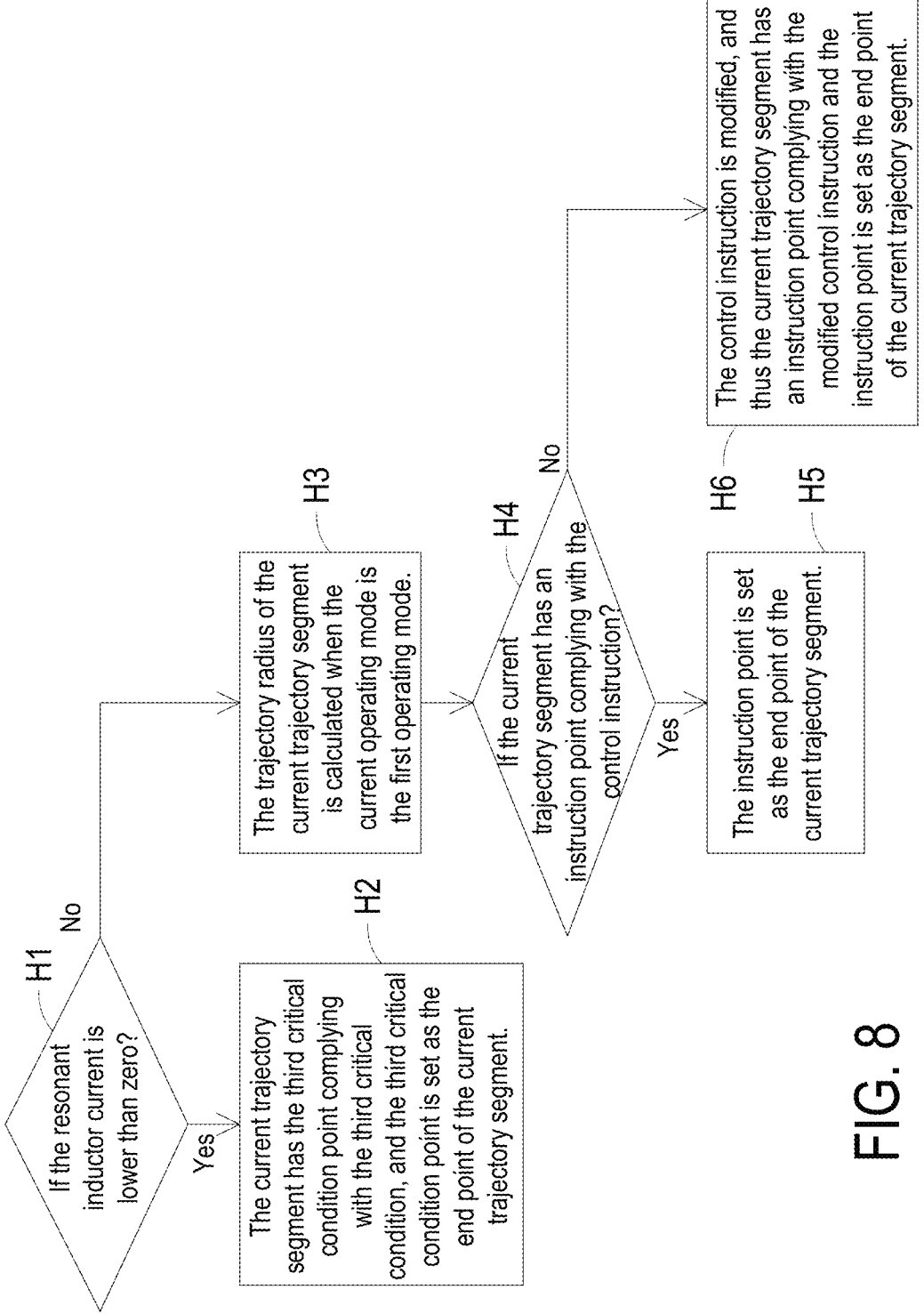
FIG. 8 is a flowchart of a control method for the resonant conversion circuit, in which the current operating mode of the resonant conversion circuit is the N mode.

Please refer to FIGS. 1, 3 and 8. FIG. 8 is a flowchart of a control method for the resonant conversion circuit, in which the current operating mode of the resonant conversion circuit is the N mode. If the controller 7 determines that the current operating mode of the resonant conversion circuit 1 is the N mode (i.e., the first mode), the step S3 further includes the following steps.

Firstly, a step H1 is performed to determine whether the resonant inductor current is lower than 0.

If the determining condition of the step H1 is satisfied, it means that the resonant inductor current is lower than 0. Then, in a step H2, it is determined that the current trajectory segment has the third critical condition point complying with the third critical condition. In addition, the third critical condition point is set as the end point of the current trajectory segment.

If the determining condition of the step H1 is not satisfied, it means that the resonant inductor current is greater than or equal to 0. Then, in a step H3, the trajectory radius of the current trajectory segment is calculated when the current operating mode is the first operating mode. Then, a step H4 is performed to determine whether the current trajectory segment has an instruction point complying with the control instruction C.

If the determining condition of the step H4 is satisfied, it means that the current trajectory segment has an instruction point complying with the control instruction C. Then, in a step H5, the instruction point is set as the end point of the current trajectory segment.

If the determining condition of the step H4 is satisfied, it means that the current trajectory segment has no instruction point complying with the control instruction C. Then, in a step H6, the control instruction C is modified. Consequently, the current trajectory segment has an instruction point complying with the modified control instruction C, and the instruction point corresponding to the modified control instruction C is set as the end point of the current trajectory segment.

In case that the current operating mode of the resonant conversion circuit 1 is the N mode (i.e., the first mode) and the end point of the current trajectory segment is the third critical condition point, the third critical condition point is also the starting point of the next trajectory segment. Under this circumstance, the corresponding next operating mode is the second operating mode or the third operating mode. Furthermore, the next operating mode is determined as the second operating mode or the third operating mode according to the following determining conditions:

if $|V_{crN}| \geq |V_{crLmtN\_P}|$, the next operating mode is the third operating mode; or if $|V_{crN}| < |V_{crLmtN\_P}|$, the next operating mode is the second operating mode, in which:

$$V_{crLmtN\_P} = -V_{inN} + V_{ON} * \frac{L_m + L_r}{L_m}$$

In the above mathematic formulae, $V_{crN}$ is the per-unit value of the resonant capacitor voltage at the resonant capacitor Cr, $V_{inN}$ is the per-unit value of the input voltage of the switching circuit 3, $V_{ON}$ is the per-unit value of the output voltage of the rectifier circuit 6, $L_m$ is the inductance value of the magnetizing inductor of the transformer 4, and $L_r$ is the inductance value of the resonant inductor.

In case that the current operating mode of the resonant conversion circuit 1 is the N mode (i.e., the first mode), the trajectory radius may be calculated according to the following mathematic formula:

$$R_{NN} = \sqrt{(V_{crON} - (V_{inN} + V_{ON}))^2 + (i_{LrON})^2}$$

In the above mathematic formula, $R_{NN}$ is the per-unit value of the trajectory radius of the current trajectory segment when the current operating mode is the first mode, $V_{crON}$ is the per-unit value of the resonant capacitor voltage at the starting point of the current trajectory segment, $V_{inN}$ is the per-unit value of the input voltage of the switching circuit 3, $V_{ON}$ is the per-unit value of the input voltage of the rectifier circuit 6, and $i_{LrON}$ is the per-unit value of the resonant inductor current at the starting point of the current trajectory segment.

If the determining condition of the step H4 is satisfied, it means that the current trajectory segment has an instruction point complying with the control instruction C. Meanwhile, the following mathematic formula is deduced:

$$R_{NN} + (V_{inN} + V_{ON}) > V_{crRrefN}$$

In the above mathematic formulae, $R_{NN}$ is the per-unit value of the trajectory radius of the current trajectory segment when the current operating mode is the first mode, $V_{inN}$ is the per-unit value of the input voltage of the switching circuit 3, $V_{ON}$ is the per-unit value of the input voltage of the rectifier circuit 6, and $V_{crRrefN}$ is the per-unit value of the command voltage.

In the following diagrams, two methods of switching the operating mode of the resonant conversion circuit 1 from the first operating mode to the second operating mode according to different critical conditions will be illustrated with reference to the operating trajectory with a plurality of trajectory segments.

Figure 9A:
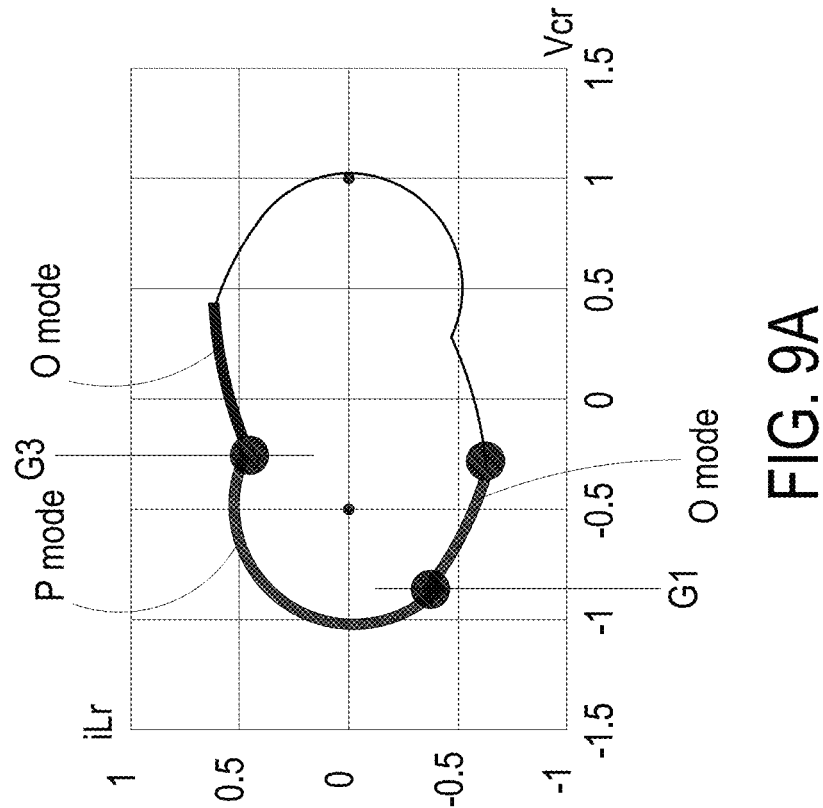
FIG. 9A is a plot illustrating the operating trajectory of the resonant conversion circuit when the resonant conversion circuit is operated in the O mode, the P mode and the O mode sequentially.

Please refer to FIGS. 1 and 9A. FIG. 9A is a plot illustrating the operating trajectory of the resonant conversion circuit when the resonant conversion circuit is operated in the different working modes. In case that the first operating mode of the resonant conversion circuit 1 is the O mode and the first trajectory segment has a first critical condition point complying with the first critical condition G1, the next operating mode of the resonant conversion circuit 1 is the P mode. When the resonant conversion circuit 1 is operated in the P mode, the corresponding second trajectory segment has no instruction point complying with the control instruction C. Since the second trajectory segment has a third critical condition point complying with the third critical condition point G3, the third operating mode of the resonant conversion circuit 1 is the O mode. However, since the third trajectory segment has an instruction point complying with the control instruction C, the whole operating trajectory is ended. That is, the operating trajectory shown in FIG. 9A is composed of the three trajectory segments corresponding to the O mode, the P mode and the O mode.

Figure 9B:
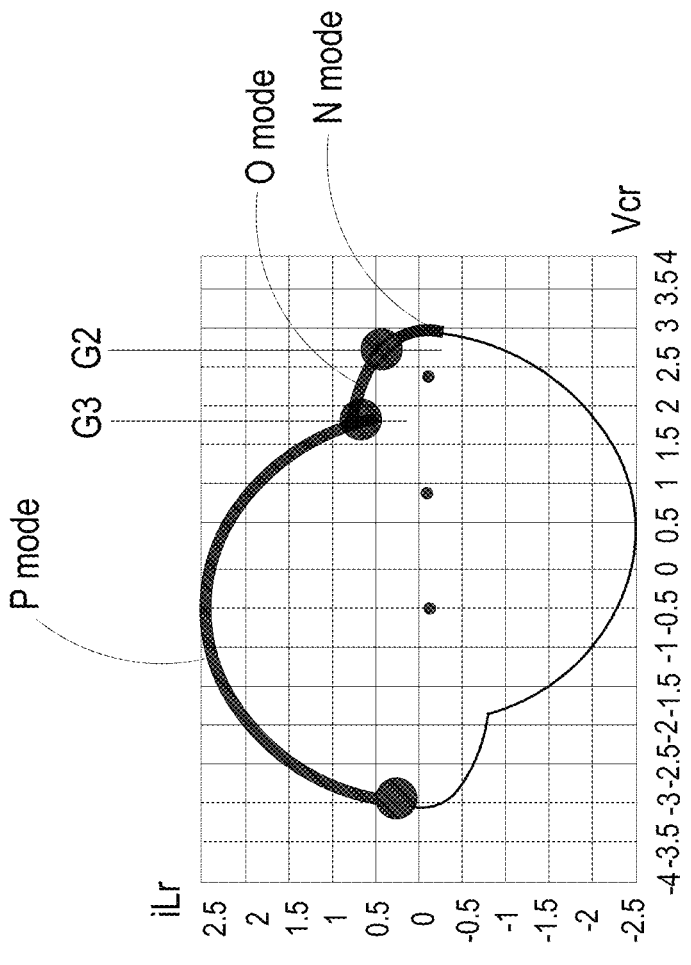
FIG. 9B is a plot illustrating the operating trajectory of the resonant conversion circuit when the resonant conversion circuit is operated in the P mode, the O mode and the N mode sequentially.

Please refer to FIGS. 1 and 9B. FIG. 9B is a plot illustrating the operating trajectory of the resonant conversion circuit when the resonant conversion circuit is operated in the different working modes. As shown in FIG. 9B, the first operating mode of the resonant conversion circuit 1 is the P mode. Moreover, in case that the first trajectory segment has a third critical condition point complying with the third critical condition G3, the second operating mode of the resonant conversion circuit 1 is the O mode. When the resonant conversion circuit 1 is operated in the O mode, and the second trajectory segment has a second critical condition point complying with the second critical condition G2, the third operating mode operated by the resonant conversion circuit 1 is the N mode. Since the third trajectory segment corresponding to the N mode has an instruction mode complying with the control instruction C, the operating trajectory is ended. That is, the operating trajectory in FIG. 9B includes the three trajectory segments corresponding to the P mode, the O mode and the N mode.

Please refer to FIGS. 1 and 3 again. After the starting point and the end point of the operating trajectory of the resonant conversion circuit 1 are confirmed, it is necessary to further calculate the execution time between the starting point and the end point of the operating trajectory. Hereinafter, the method of calculating the execution time of the trajectory segment of the operating trajectory of the resonant conversion circuit 1 when the operating mode is the N mode, the P mode or the O mode will be described as follows.

Figure 10A:
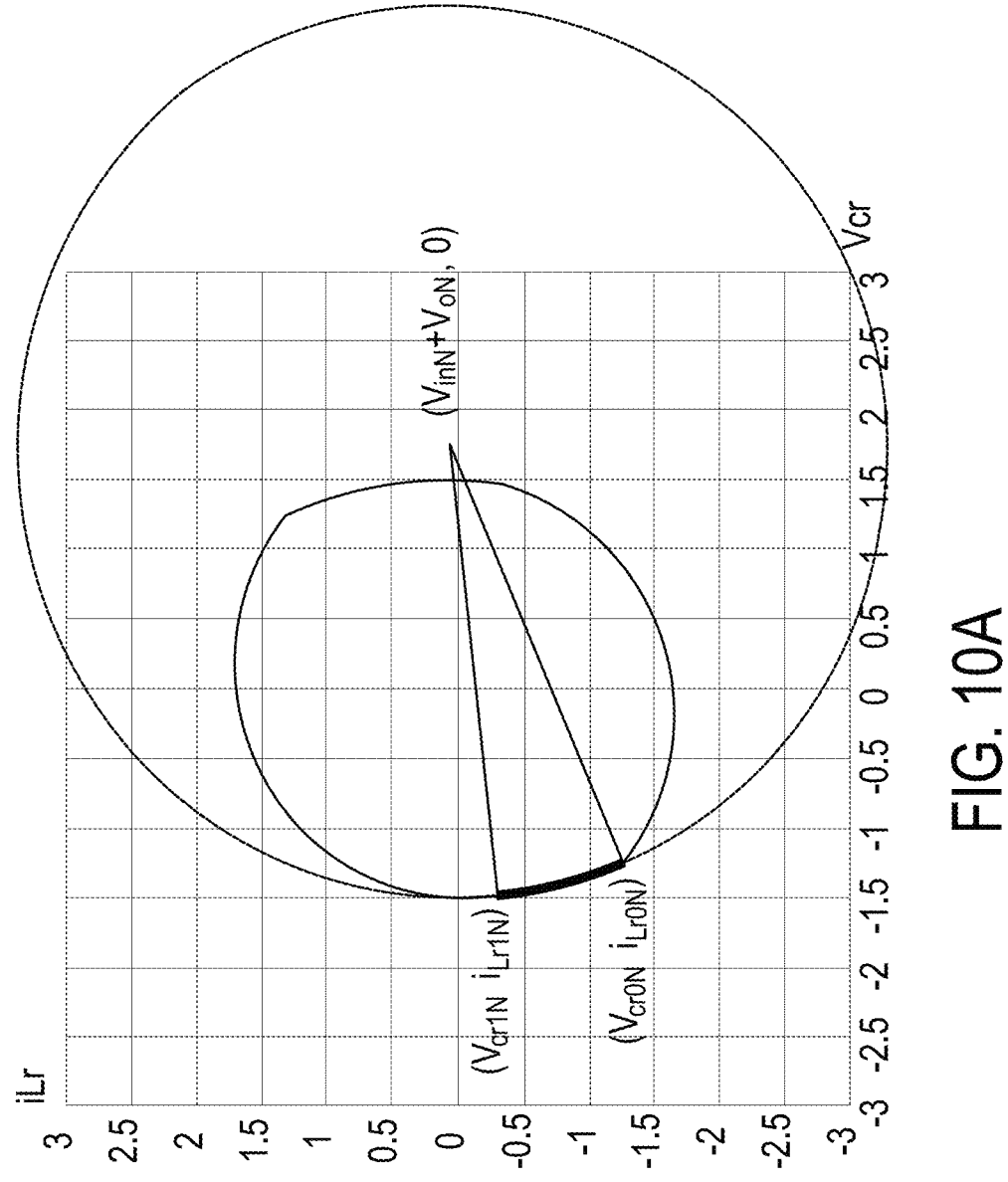
FIG. 10A is a plot illustrating the trajectory segment of the resonant conversion circuit when the operating mode is the N mode.

Please refer to FIGS. 1, 3 and 10A. FIG. 10A is a plot illustrating the trajectory segment of the resonant conversion circuit when the operating mode is the N mode. In FIG. 10A, the solid line denotes the real trajectory segment, and the dashed line denotes the simulated trajectory segment. When the operating mode is the N mode, the controller 7 calculates the real trajectory segment, the simulated trajectory segment, the time duration $\Delta T_N$ between the starting point and the end point of the trajectory segment according to the following mathematic formulae:

$$R_{NN} = \sqrt{(V_{crON} - (V_{inN} + V_{ON}))^2 + (i_{LrON})^2}$$

$$\begin{cases} V_{cr1N} - c = \cos(\omega_r \Delta T_N)(V_{crON} - c) + \sin(\omega_r \Delta T_N) i_{Lr0N} \\ i_{Lr1N} = -\sin(\omega_r \Delta T_N)(V_{crON} - c) + \cos(\omega_r \Delta T_N) i_{Lr0N} \end{cases}$$

$$i_{Lm1N} = i_{Lm0N} + \Delta T_N \frac{V_{ON}}{L_m} \sqrt{\frac{L_r}{C_r}}$$

$$i_{Lr1N} = i_{Lm1N}$$

$$c = V_{inN} + V_{ON}$$

$$i_{Lm0N} = i_{Lr0N} - i_{s0N}$$

In the above mathematic formula, $R_{NN}$ is the per-unit value of the trajectory radius of the current trajectory segment when the current operating mode is the N mode, $V_{crON}$ is the per-unit value of the resonant capacitor voltage at the starting point of the current trajectory segment, $V_{inN}$ is the per-unit value of the input voltage of the switching circuit 3, $V_{ON}$ is the per-unit value of the output voltage of the rectifier circuit 6, $i_{LrON}$ is the per-unit value of the resonant inductor current at the starting point of the current trajectory segment, $V_{cr1N}$ is the per-unit value of the resonant capacitor voltage at the end point of the current trajectory segment, $i_{Lr1N}$ is the per-unit value of the resonant inductor current at the end point of the current trajectory segment, $i_{soN}$ is the per-unit value of the secondary current flowing through the secondary winding 42, $i_{LrON}$ is the per-unit value of the resonant inductor current at the starting point of the current trajectory segment, $i_{Lr1N}$ is the per-unit value of the resonant inductor current at the end point of the current trajectory segment, $i_{Lm0N}$ is the per-unit value of the magnetizing inductance current flowing through the transformer 4 at the starting point of the current trajectory segment, $i_{Lm1N}$ is the per-unit value of the magnetizing inductance current flowing through the transformer 4 at the end point of the current trajectory segment, and $\omega r$ is the angular frequency.

Figure 10B:
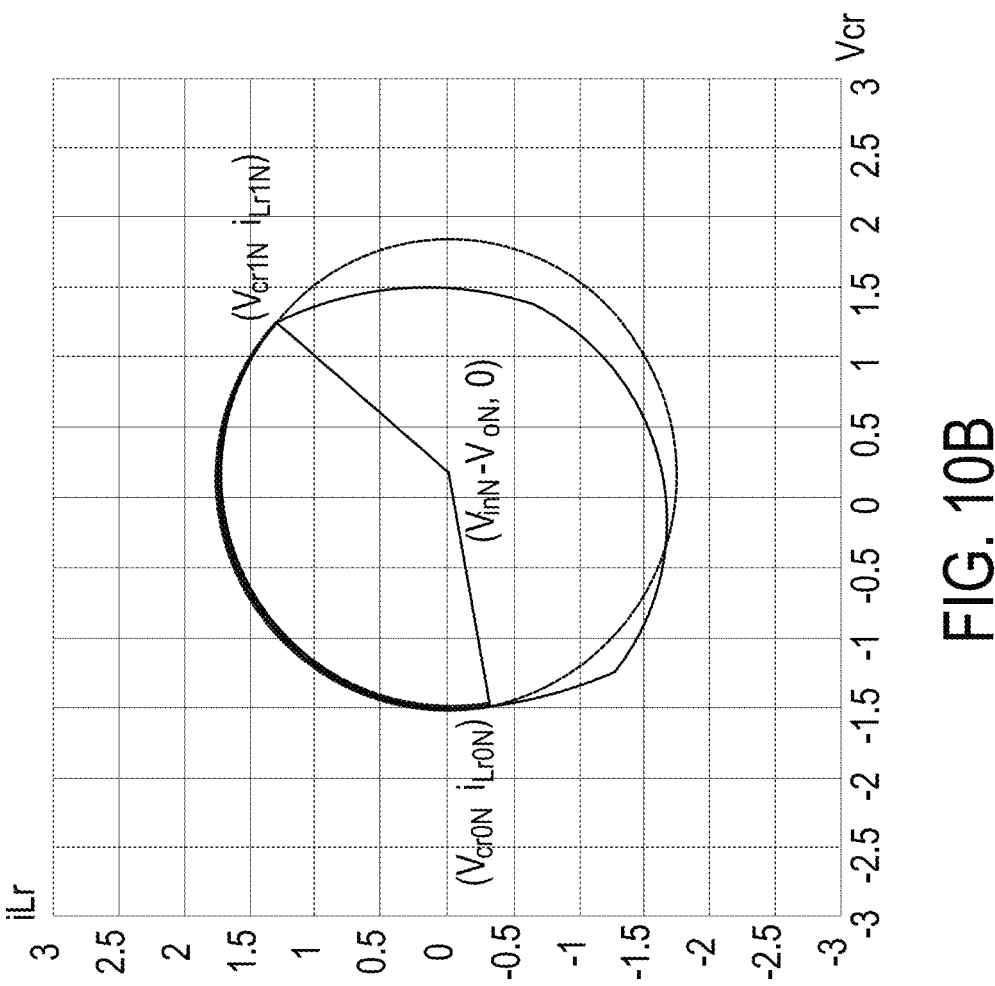
FIG. 10B is a plot illustrating the trajectory segment of the resonant conversion circuit when the operating mode is the P mode.

Please refer to FIGS. 1, 3 and 10B. FIG. 10B is a plot illustrating the trajectory segment of the resonant conversion circuit when the operating mode is the P mode. In FIG. 10B, the solid line denotes the real trajectory segment, and the dashed line denotes the simulated trajectory segment. When the operating mode is the P mode, the controller 7 calculates the real trajectory segment, the simulated trajectory segment, the time duration $\Delta T_P$ between the starting point and the end point of the trajectory segment according to the following mathematic formulae:

$$R_{PN} = \sqrt{(V_{crON} - (V_{inN} - V_{ON}))^2 + (i_{LrON})^2}$$

$$\begin{cases} V_{cr1N} - c = \cos(\omega_r \Delta T_P)(V_{crON} - c) + \sin(\omega_r \Delta T_P) i_{Lr0N} \\ i_{Lr1N} = -\sin(\omega_r \Delta T_P)(V_{crON} - c) + \cos(\omega_r \Delta T_P) i_{Lr0N} \end{cases}$$

$$i_{Lm1N} = i_{Lm0N} + \Delta T_P \frac{V_{ON}}{L_m} \sqrt{\frac{L_r}{C_r}}$$

$$i_{Lr1N} = i_{Lm1N}$$

$$c = V_{inN} + V_{ON}$$

-continued $$i_{Lm0N} = i_{Lr0N} - i_{s0N}$$

In the above mathematic formulae, $R_{PN}$ is the per-unit value of the trajectory radius of the current trajectory segment when the current operating mode is the P mode, $V_{crON}$ is the per-unit value of the resonant capacitor voltage at the starting point of the current trajectory segment, $V_{inN}$ is the per-unit value of the input voltage of the switching circuit 3, $V_{ON}$ is the per-unit value of the output voltage of the rectifier circuit 6, $i_{LrON}$ is the per-unit value of the resonant inductor current at the starting point of the current trajectory segment, $V_{cr1N}$ is the per-unit value of the resonant capacitor voltage at the end point of the current trajectory segment, $i_{Lr1N}$ is the per-unit value of the resonant inductor current at the end point of the current trajectory segment, $i_{soN}$ is the per-unit value of the secondary current flowing through the secondary winding 42, $i_{LrON}$ is the per-unit value of the resonant inductor current at the starting point of the current trajectory segment, $i_{Lr1N}$ is the per-unit value of the resonant inductor current at the end point of the current trajectory segment, $i_{Lm0N}$ is the per-unit value of the magnetizing inductance current flowing through the transformer 4 at the starting point of the current trajectory segment, $i_{Lm1N}$ is the per-unit value of the magnetizing inductance current flowing through the transformer 4 at the end point of the current trajectory segment, and $\omega_r$ is the angular frequency.

Please refer to FIGS. 1, 3 and 10C. FIG. 10C is a plot illustrating the trajectory segment of the resonant conversion circuit when the operating mode is the O mode. In FIG. 10C, the solid line denotes the real trajectory segment, and the dashed line denotes the simulated trajectory segment. When the operating mode is the O mode, the controller 7 calculates the real trajectory segment, the simulated trajectory segment, the time duration $\Delta T_O$ between the starting point and the end point of the trajectory segment according to the following mathematic formulae:

In the left drawing of FIG. 10C, the operating trajectory in the O mode is an elliptic trajectory. For facilitating calculation, the per-unit values are obtained through re-standardization. The re-standardization is performed according to the following mathematic formulae:

$$V'_{CrN} = V_{CrN}$$

$$i'_{LrN} = i_{LrN}/m$$

$$m = \sqrt{\frac{L_m + L_r}{L_r}}$$

In the above mathematic formulae, $V_{crN'}$ is the per-unit value of the resonant capacitor voltage after re-standardization, $i_{LrN'}$ is the per-unit value of the resonant inductor current after re-standardization, $L_m$ is the inductance value of the magnetizing inductor of the transformer 4, and $L_r$ is the inductance value of the resonant inductor.

After the per-unit values of the resonant capacitor voltage and the resonant inductance current are obtained again, the trajectory in the O mode is a circular trajectory. Furthermore, the operating trajectory in the O mode can be calculated according to the following mathematic formulae:

$$R_{ON} = \sqrt{(V_{crON} - V_{inN})^2 + (mi_{LrON})^2}$$

-continued $$mi_{LrN1} = \sqrt{R_{ON}^2 - (V_{cr1N} - 1)^2}$$

$$\Delta T_O = \frac{\theta}{\omega_p} = \frac{\arccos\frac{2R_1^2 - \left[(V_{cr0N} - V_{cr1N})^2 + (mi_{Lr0N} - mi_{Lr1N})^2\right]}{2R_1^2}}{\omega_p}$$

$$V_{Cr1N} = -V_{CrLmtN\_P}$$

$$V_{crLmtN\_P} = -V_{inN} + V_{ON} * \frac{L_m + L_r}{L_m}$$

$$m = \sqrt{\frac{L_m + L_r}{L_r}}$$

In the above mathematic formulae, $R_{ON}$ is the per-unit value of the trajectory radius of the current trajectory segment when the current operating mode is the O mode, $V_{crON}$ is the per-unit value of the resonant capacitor voltage at the starting point of the current trajectory segment, $V_{inN}$ is the per-unit value of the input voltage of the switching circuit 3, $i_{LrON}$ is the per-unit value of the resonant inductor current at the starting point of the current trajectory segment, $V_{cr1N}$ is the per-unit value of the resonant capacitor voltage at the end point of the current trajectory segment, $i_{LrON}$ is the per-unit value of the resonant inductor current at the starting point of the current trajectory segment, $i_{Lr1N}$ is the per-unit value of the resonant inductor current at the end point of the current trajectory segment, $\omega_p$ is the angular frequency, and $\theta$ is an angle corresponding to the current trajectory segment.

Figures 11A, 11B:
FIG. 11A is a schematic timing waveform diagram illustrating the input voltage of the switching circuit in the resonant conversion circuit as shown in FIG. 1.
FIG. 11B is a voltage timing waveform diagram illustrating the output current of the rectifier circuit in the resonant conversion circuit as shown in FIG. 1.
Figure 11C:
FIG. 11C is a current timing waveform diagram illustrating the output voltage of the rectifier circuit in the resonant conversion circuit as shown in FIG. 1.
Figure 11D:
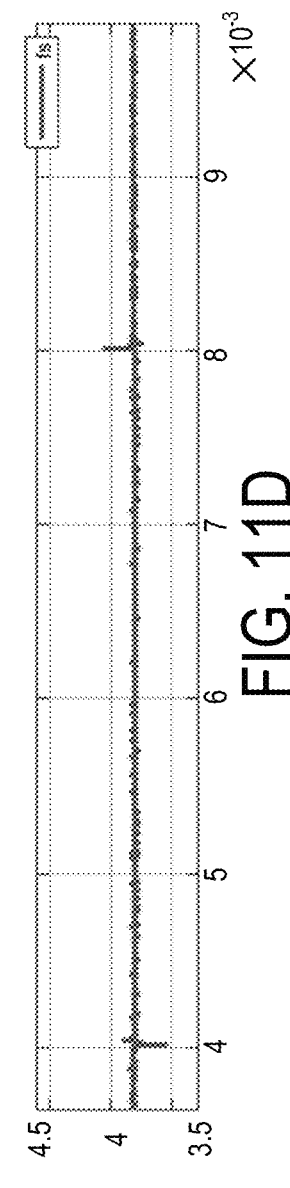
FIG. 11D is a control frequency waveform diagram illustrating the control frequency of the rectifier circuit in the resonant conversion circuit as shown in FIG. 1.
Figures 11E, 11F, 11G:
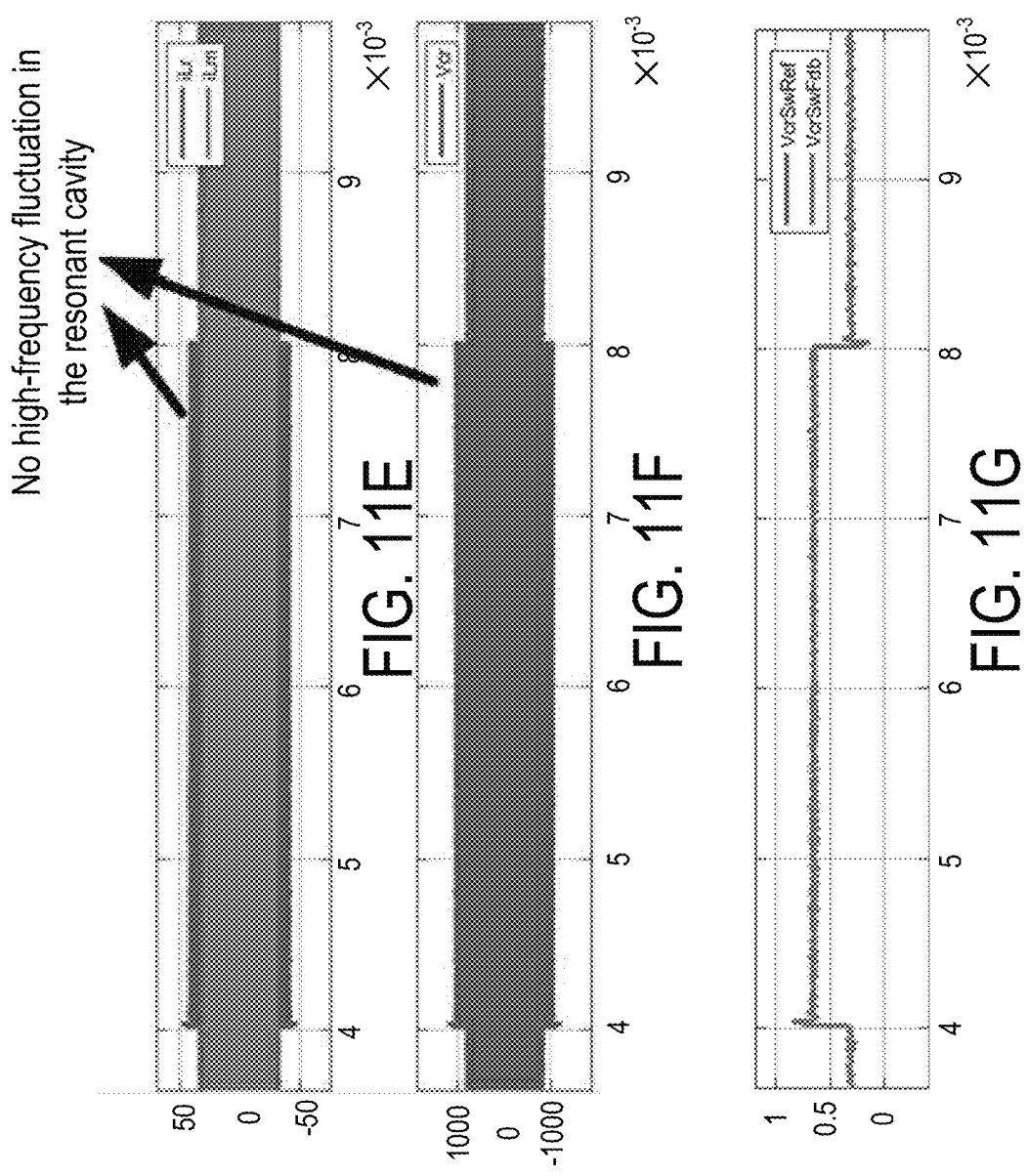
FIG. 11E is a current waveform diagram illustrating the resonant inductor current flowing through the resonant inductor and the magnetizing inductance current flowing through the magnetizing inductance of the transformer in the resonant conversion circuit as shown in FIG. 1.
FIG. 11F is a voltage waveform diagram illustrating the resonant capacitor voltage of the resonant capacitor in the resonant conversion circuit as shown in FIG. 1.
FIG. 11G is a voltage waveform diagram illustrating the reference value of the resonant capacitor voltage of the resonant capacitor in the resonant conversion circuit as shown in FIG. 1.

FIG. 11A is a schematic timing waveform diagram illustrating the input voltage of the switching circuit in the resonant conversion circuit as shown in FIG. 1. FIG. 11B is a voltage waveform diagram illustrating the output current of the rectifier circuit in the resonant conversion circuit as shown in FIG. 1. FIG. 11C is a current waveform diagram illustrating the output voltage of the rectifier circuit in the resonant conversion circuit as shown in FIG. 1. FIG. 11D is a control frequency waveform diagram illustrating the control frequency of the rectifier circuit in the resonant conversion circuit as shown in FIG. 1. FIG. 11E is a current waveform diagram illustrating the resonant inductor current flowing through the resonant inductor and the magnetizing inductance current flowing through the magnetizing inductance of the transformer in the resonant conversion circuit as shown in FIG. 1. FIG. 11F is a voltage waveform diagram illustrating the resonant capacitor voltage of the resonant capacitor in the resonant conversion circuit as shown in FIG. 1. FIG. 11G is a voltage waveform diagram illustrating the reference value of the resonant capacitor voltage of the resonant capacitor in the resonant conversion circuit as shown in FIG. 1.

In an experiment example, the resonant conversion circuit 1 is operated under the following conditions. For example, the capacitance of the resonant capacitor Cr is 16.5 nF, the inductance of the resonant inductor Lr is 11.8 uH, the inductance of the magnetizing inductance $L_m$ is 20.1 uH, the capacitance of the output capacitor Co is 800 uF, the frequency of the resonant conversion circuit 1 is 360 kHz, the transformation ratio n of the transformer 4 is 3.7, the input voltage Vin is 1000V, the output voltage Vois 270V, and the input power P is 20 kW.

From FIGS. 11B and 11C, it can be seen that the output voltage of the rectifier circuit 6 has a voltage fluctuation of 0.6V and a recovery time is 0.3 ms when the output current is subjected to a sudden change (e.g., a change from 50% to 100% or a change from 100% to 50%). From FIGS. 11E and 11F, it can be seen that the resonant cavity of the resonant conversion circuit 1 has no high frequency fluctuations and has good dynamic response.

In case that the input voltage contains harmonic disturbance, the control method of the present disclosure is capable of inhibiting the harmonic disturbance.

Figures 12A, 12B:
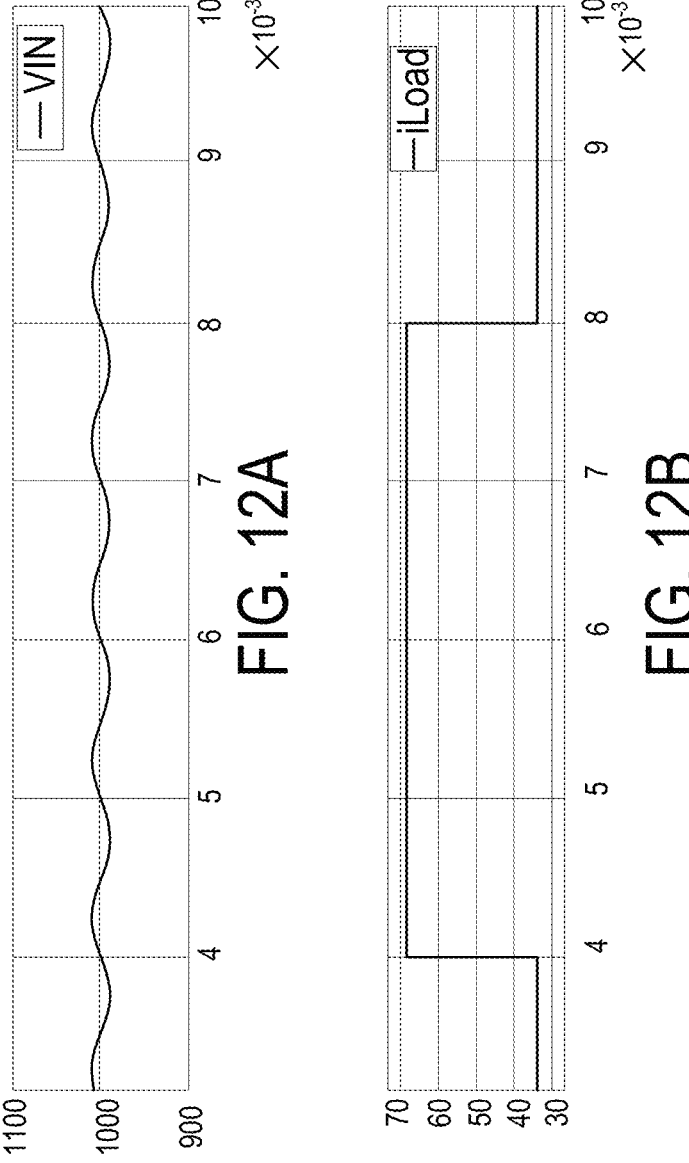
FIG. 12A is a voltage waveform diagram illustrating the input voltage of the switching circuit in the resonant conversion circuit as shown in FIG. 1.
FIG. 12B is a current waveform diagram illustrating the output current of the rectifier circuit in the resonant conversion circuit as shown in FIG. 1.
Figures 12C, 12D:
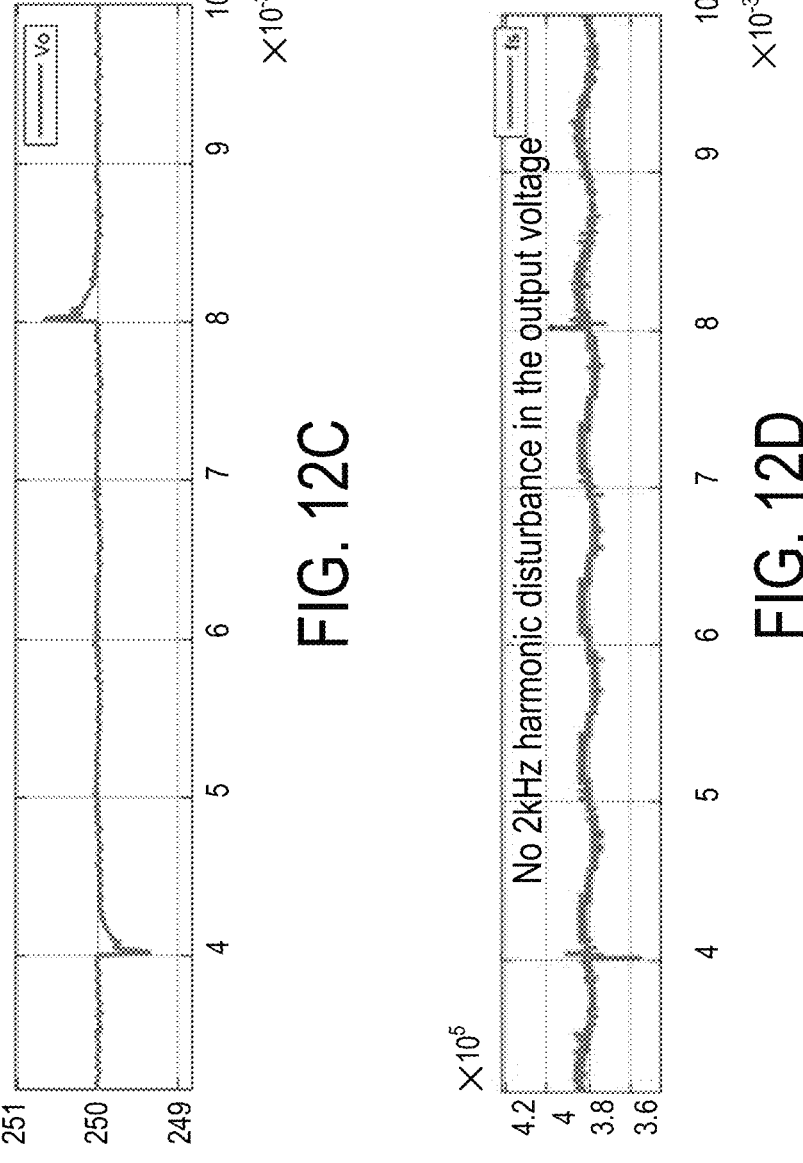
FIG. 12C is a voltage waveform diagram illustrating the output voltage of the rectifier circuit in the resonant conversion circuit as shown in FIG. 1.
FIG. 12D is a control frequency waveform diagram illustrating the control frequency of the rectifier circuit in the resonant conversion circuit as shown in FIG. 1.

FIG. 12A is a voltage waveform diagram illustrating the input voltage of the switching circuit in the resonant conversion circuit as shown in FIG. 1. FIG. 12B is a current waveform diagram illustrating the output current of the rectifier circuit in the resonant conversion circuit as shown in FIG. 1. FIG. 12C is a voltage waveform diagram illustrating the output voltage of the rectifier circuit in the resonant conversion circuit as shown in FIG. 1. FIG. 12D is a control frequency waveform diagram illustrating the control frequency of the rectifier circuit in the resonant conversion circuit as shown in FIG. 1.

For example, the input voltage Vin of the resonant conversion circuit 1 is 1000V, and the harmonic disturbance is 2 kHz. The efficacy of inhibiting the harmonic disturbance can be understood with reference to FIGS. 12A to 12D. In other words, the resonant conversion circuit 1 of the present disclosure has wider bandwidth. Moreover, the control method of the present disclosure is capable of inhibiting the harmonic disturbance.

From the above descriptions, the present disclosure provides a control circuit for a resonant conversion circuit. The switching circuit, the resonant network and the rectifier circuit of the resonant conversion circuit are connected with each other. Firstly, a starting point of an operating trajectory is determined according to a sampling data sampled at a first switching time point. The operating trajectory includes a plurality of trajectory segments. Then, the starting point of each trajectory segment is determined. The operating mode is determined according to the starting point of the corresponding trajectory segment, and a curve and an end point of the trajectory segment are predicted according to the operating mode. Then, the duration time of each trajectory segment is calculated. The end point of the operating trajectory is determined according to a control instruction. According to the execution time between the starting point and the end point of the operating trajectory, the next switching time point is controlled. By changing the switching time point, the switching frequency of the switching circuit can be controlled. Consequently, the resonance cavity of the resonant conversion circuit has no high-frequency fluctuations, the dynamic response is enhanced, the bandwidth is increased, and the harmonic disturbance is effectively inhibited.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A control method for a resonant conversion circuit, wherein the resonant conversion circuit comprises a switching circuit, a resonant network and a rectifier circuit, the switching circuit, the resonant network and the rectifier circuit are connected successively, the resonant network comprises a resonant capacitor and a resonant inductor, the control method comprising steps of:

(S0) determining a starting point of an operating trajectory according to a sampling data at a first switching time point, wherein the operating trajectory comprises a first trajectory segment of N trajectory segments, and N is a positive integer;

(S1) determining an initial operating mode of the resonant conversion circuit according to a starting point of the first trajectory segment of the N trajectory segments, wherein the starting point of the first trajectory segment is the starting point of the operating trajectory;

(S2) setting the first trajectory segment as a current trajectory segment, and setting the initial operating mode as a current operating mode;

(S3) predicting a curve of the current trajectory segment and an end point of the current trajectory segment according to the current operating mode;

(S4) calculating a time duration of the current trajectory segment;

(S5) determining whether the end point of the current trajectory segment is an instruction point complying with a control instruction, wherein if a determining condition of the step (S5) is not satisfied, a step (S6) is performed, wherein if the determining condition of the step (S5) is satisfied, a step (S10) is performed;

(S6) setting the end point of the current trajectory segment as a starting point of a next trajectory segment;

(S7) determining a next operating mode of the resonant conversion circuit according to the starting point of the next trajectory segment;

(S8) setting the next trajectory segment as the current trajectory segment, and setting the next operating mode as the current operating mode;

(S9) performing the step (S3) again;

(S10) setting the instruction point as an end point of the operating trajectory, and calculating an execution time from the starting point of the operating trajectory to the end point of the operating trajectory; and (S11) determining a second switching time point according to the execution time.

2. The control method according to claim 1, wherein the sampling data includes a state information of the resonant network corresponding to the first switching time point, an input voltage of the switching circuit, an output voltage of the rectifier circuit and a resonant parameter of the resonant network, wherein the state information includes a resonant inductor current and a resonant capacitor voltage, and the resonant parameter includes a inductance value of the resonant inductor and a capacitance of the resonant capacitor.

3. The control method according to claim 2, wherein the resonant conversion circuit is a LLC resonant conversion circuit, the LLC resonant conversion circuit further comprises a transformer, and the transformer comprises a primary winding and a secondary winding, wherein the primary winding is electrically connected with the resonant network, the secondary winding is electrically connected with the rectifier circuit, and the sampling data further includes a secondary current of the LLC resonant conversion circuit.

4. The control method according to claim 3, wherein a type of the initial operating mode or the current operating mode includes a first operating mode, or a second operating mode or a third operating mode, wherein the first operating mode is an N mode, the second operating mode is an O mode, and the third operating mode is a P mode.

5. The control method according to claim 4, wherein in the step (S1), the type of the initial operating mode is determined according to the secondary current, wherein when the secondary current is lower than zero, the initial operating mode of the LLC resonant conversion circuit is the first mode, wherein when the secondary current is equal to zero, the initial operating mode of LLC resonant conversion circuit is the second mode, wherein when the secondary current is greater than zero, the initial operating mode of the LLC resonant conversion circuit is the third mode.

6. The control method according to claim 5, wherein when the current operating mode of the LLC resonant conversion circuit is the second mode, the step (S3) further comprises steps of:

(a1) calculating a trajectory radius of the current trajectory segment corresponding to the second operating mode;

(a2) determining whether the resonant inductor current is lower than zero;

(a3) when the resonant inductor current is lower than zero, determining whether the current trajectory segment has a first critical condition point complying with a first critical condition; and (a4) when the current trajectory segment has the first critical condition point, setting the first critical condition point as the end point of the current trajectory segment.

7. The control method according to claim 6, wherein the step (S7) further comprises steps of: when the first critical condition point is the starting point of the next trajectory segment, the next operating mode is the third operating mode.

8. The control method according to claim 6, wherein the step (S3) further comprises steps of:

(b1) when the resonant inductor current is lower than zero and the current trajectory segment does not have the first critical condition point, performing a step (b3);

(b2) when the resonant inductor current is greater than or equal to zero, performing the step (b3);

(b3) determining whether the current trajectory segment has the instruction point complying with the control instruction; and (b4) when the current trajectory segment has the instruction point complying with the control instruction, setting the instruction point as the end point of the current trajectory segment.

9. The control method according to claim 8, wherein the step (S3) further comprises steps of:

(c1) when the current trajectory segment does not have the instruction point complying with the control instruction, determining whether the current trajectory segment has a second critical condition point complying with a second critical condition;

(c2) when the current trajectory segment has the second critical condition point, setting the second critical condition point as the end point of the current trajectory segment; and (c3) when the current trajectory segment does not have the second critical condition point, modifying the control instruction such that the current trajectory segment has the instruction point complying with the modified control instruction, and setting the instruction point corresponding to the modified control instruction as the end point of the current trajectory segment.

10. The control method according to claim 9, wherein in the step (S7), when the second critical condition point is the starting point of the next trajectory segment, the next operating mode is the first operating mode.

11. The control method according to claim 6, wherein in the step (a1), the trajectory radius of the current trajectory segment corresponding to the current trajectory segment is calculated according to following mathematic formulae:

$$R_{ON} = \sqrt{(V_{crON} - V_{inN})^2 + (mi_{LrON})^2}$$

$$m = \sqrt{\frac{L_m + L_r}{L_r}}$$

wherein $R_{ON}$ is per-unit value of the trajectory radius of the current trajectory segment corresponding to the second mode, $V_{crON}$ is a per-unit value of the resonant capacitor voltage at the starting point of the current trajectory segment, $V_{inN}$ is a per-unit value of the input voltage of the switching circuit, $i_{LrON}$ is a per-unit value of the resonant inductor current at the starting point of the current trajectory segment, $L_m$ is an inductance value of a magnetizing inductor of the transformer, and $L_r$ is an inductance value of the resonant inductor.

12. The control method according to claim 6, wherein in the step (a4), when the current trajectory segment has the first critical condition point, following mathematic formulae are obtained:

$$V_{crN} = V_{crLmtN\_P}$$

$$V_{crLmtN\_P} = -V_{inN} + V_{ON} * \frac{L_m + L_r}{L_m}$$

wherein $V_{crN}$ is a per-unit value of the resonant capacitor voltage, $V_{inN}$ is a per-unit value of the input voltage of the switching circuit, $V_{ON}$ is a per-unit value of an output voltage of the rectifier circuit, $L_m$ is an inductance value of a magnetizing inductor of the transformer, and $L_r$ is an inductance value of the resonant inductor.

13. The control method according to claim 8, wherein in the step (b4), when the current trajectory segment has the instruction point, following mathematic formulae are obtained:

$$|R_{ON} + V_{inN}| > V_{crLmtN\_N}$$

$$V_{crLmtN\_N} = V_{inN} + V_{ON} * \frac{L_m + L_r}{L_m}$$

$$R_{ON} = \sqrt{(V_{crON} - V_{inN})^2 + (mi_{LrON})^2}$$

$$m = \sqrt{\frac{L_m + L_r}{L_r}}$$

wherein $R_{ON}$ is a per-unit value of the trajectory radius of the current trajectory segment corresponding to the second mode, $V_{inN}$ a per-unit value of the input voltage of the switching circuit, $V_{ON}$ is a per-unit value of the output voltage of the rectifier circuit, $V_{crON}$ is a per-unit value of the resonant capacitor voltage at the starting point of the current trajectory segment, $L_m$ is an inductance value of a magnetizing inductance of the transformer, and $L_r$ is an inductance value of the resonant inductor.

14. The control method according to claim 9, wherein in the step (c2), when the current trajectory segment has the second critical condition point, following mathematic formulae are obtained:

$$V_{crN} = V_{crLmtN\_N}$$

$$V_{crLmtN\_N} = V_{inN} + V_{ON} * \frac{L_m + L_r}{L_m}$$

wherein $V_{crN}$ is a per-unit value of the resonant capacitor voltage, $V_{inN}$ is a per-unit value of the input voltage of the switching circuit, $V_{ON}$ is a per-unit value of the output voltage of the rectifier circuit, $L_m$ is an inductance value of a magnetizing inductance of the transformer, and $L_r$ is an inductance value of the resonant inductor.

15. The control method according to claim 9, wherein in the step (c3), when the current trajectory segment has the instruction point complying with the modified control instruction, a following mathematic formula is obtained:

$$i_{LrN} = i_{LrRefN}$$

wherein $i_{LrN}$ is a per-unit value of the resonant inductor current, and $i_{LrRefN}$ is a per-unit value of a reference current of the resonant inductor.

16. The control method according to claim 5, wherein when the current operating mode of the LLC resonant conversion circuit is the third mode, the step (S3) further comprises steps of:
  (d1) calculating a trajectory radius of the current trajectory segment corresponding to the third operating mode;
  (d2) determining whether the current trajectory segment has the instruction point complying with the control instruction;
  (d3) when the current trajectory segment has the instruction point, setting the instruction point as the end point of the current trajectory segment; and
  (d4) when the current trajectory segment does not have the instruction point, confirming that the trajectory segment has a third critical condition point complying with a third critical condition, and setting the third critical condition point set as the end point of the current trajectory segment.

17. The control method according to claim 16, wherein in the step (S7), when the third critical condition point is the starting point of the next trajectory segment, the next operating mode is the second operating mode.

18. The control method according to claim 16, wherein in the step (d1), the trajectory radius corresponding to the third mode is calculated according to a following mathematic formula:

$$R_{PN} = \sqrt{(V_{crON} - (V_{inN} - V_{ON}))^2 + (i_{LrON})^2}$$

wherein $R_{PN}$ is a per-unit value of the trajectory radius of the current trajectory segment corresponding to the third mode, $V_{crON}$ is a per-unit value of the resonant capacitor voltage at the starting point of the current trajectory segment, $V_{inN}$ is a per-unit value of the input voltage of the switching circuit, $V_{ON}$ is a per-unit value of the output voltage of the rectifier circuit, and $i_{LrON}$ is a per-unit value of the resonant inductor current at the starting point of the current trajectory segment.

19. The control method according to claim 16, wherein in the step (d3), when the current trajectory segment has the instruction point, a following mathematic formula is obtained:

$$R_{PN} + (V_{inN} - V_{ON}) > V_{crRrefN}$$

$$R_{PN} = \sqrt{(V_{crON} - (V_{inN} - V_{ON}))^2 + (i_{LrON})^2}$$

wherein $R_{PN}$ is a Per-Unit Value of the Trajectory Radius of the Current trajectory segment corresponding to the third mode, wherein $V_{inN}$ is a per-unit value of the input voltage of the switching circuit, $V_{ON}$ is a per-unit value of the output voltage of the rectifier circuit, $V_{crRrefN}$ is a per-unit value of an instruction voltage of the resonant capacitor, and $i_{LrON}$ is a per-unit value of the resonant inductor current at the starting point of the current trajectory segment.

20. The control method according to claim 16, wherein in the step (d4), when the end point of the current trajectory segment is the third critical condition point, following mathematic formulae are obtained:

$$i_{soN} = 0 \text{ or } i_{LrN} = i_{LmN}$$

wherein $i_{soN}$ is a per-unit value of the secondary current flowing through the secondary winding, $i_{LrN}$ is a per-unit value of the resonant inductor current flowing through the resonant inductor Lr, and $i_{LmN}$ is a per-unit value of a magnetizing inductor current flowing through the transformer.

21. The control method according to claim 5, wherein when the current operating mode of the LLC resonant conversion circuit is the first mode, the step S3 further comprises steps of:
  (e1) determining whether the resonant inductor current is lower than zero;
  (e2) when the resonant inductor current is lower than zero, confirming that the trajectory segment has a third critical condition point complying with a third critical condition, and setting the third critical condition point set as the end point of the current trajectory segment;
  (e3) when the resonant inductor current is greater than or equal to zero, calculating the trajectory radius of the current trajectory segment corresponding to the first operating mode;
  (e4) determining whether the current trajectory segment has the instruction point complying with the control instruction;
  (e5) when the current trajectory segment has the instruction point, setting the instruction point as the end point of the current trajectory segment; and
  (e6) when the current trajectory segment does not have the instruction point, modifying the control instruction such that the current trajectory segment has the instruction point complying with the modified control instruction, and setting the instruction point corresponding to the modified control instruction as the end point of the current trajectory segment.

22. The control method according to claim 21, wherein in the step (S7), when the third critical condition point is the starting point of the next trajectory segment, the next operating mode is the second operating mode or the third operating mode.

23. The control method according to claim 22, wherein if $|V_{crN}| \geq |V_{crLmtN\_P}|$, the next operating mode is the third operating mode; or
  if $|V_{crN}| < |V_{crLmtN\_P}|$, the next operating mode is the second operating mode, in which:

$$V_{crLmtN\_P} = -V_{inN} + V_{ON} * \frac{L_m + L_r}{L_m}$$

wherein $V_{crN}$ is a per-unit value of the resonant capacitor voltage, $V_{inN}$ is a per-unit value of an input voltage of the switching circuit, $V_{ON}$ is a per-unit value of an output voltage of the rectifier circuit, $L_m$ is an inductance value of a magnetizing inductance of the transformer, and $L_r$ is an inductance value of the resonant inductor.

24. The control method according to claim 21, wherein in the step (e3), when the trajectory radius corresponding to the first mode is calculated according to a following mathematic formula:

$$R_{NN} = \sqrt{(V_{crON} - (V_{inN} + V_{ON}))^2 + (i_{LrON})^2}$$

wherein $R_{NN}$ is a per-unit value of the trajectory radius of the current trajectory segment corresponding to the first mode, $V_{crON}$ is a per-unit value of the resonant capacitor voltage at the starting point of the current trajectory segment, $V_{inN}$ is a per-unit value of the input voltage of the switching circuit, $V_{ON}$ is a per-unit value of the input voltage of the rectifier circuit, and $i_{LrON}$ is a per-unit value of the resonant capacitor voltage at the starting point of the current trajectory segment.

25. The control method according to claim 21, wherein in the step (e5), when the current trajectory segment has the instruction point, a following mathematic formula is obtained:

$$R_{NN} + (V_{inN} + V_{ON}) > V_{crRrefN}$$

wherein $R_{NN}$ is a per-unit value of the trajectory radius of the current trajectory segment corresponding to the first mode, $V_{inN}$ is a per-unit value of the input voltage of the switching circuit, $V_{ON}$ is a per-unit value of the output voltage of the rectifier circuit, and $V_{crRrefN}$ is a per-unit value of an instruction voltage of the resonant capacitor.

26. The control method according to claim 21, wherein in the step (e6), when the current trajectory segment has the instruction point complying with the modified control instruction, the following mathematic formula is obtained:

$$i_{LrN} = i_{LrRefN}$$

wherein $i_{LrN}$ is a per-unit value of the resonant inductor current, and $i_{LrRefN}$ is a per-unit value of a reference current of the resonant inductor.

\* \* \* \* \*